US012719738B2

(12) United States Patent
Gupta et al.

(10) Patent No.: US 12,719,738 B2
(45) Date of Patent: Aug. 25, 2026

(54) DETERMINING CRITICAL LOGS FOR NETWORK APPLICATIONS

(71) Applicant: Juniper Networks, Inc., Sunnyvale, CA (US)

(72) Inventors: Rahul Gupta, Kanpur (IN); Alexander Zhang Shan, Carmichael, CA (US); Thayumanavan Sridhar, Sunnyvale, CA (US); Tarun Banka, Milpitas, CA (US); Raj Yavatkar, Los Gatos, CA (US); Rahul Singh, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 18/400,481

(22) Filed: Dec. 29, 2023

(65) Prior Publication Data

US 2025/0219894 A1 Jul. 3, 2025

(51) Int. Cl.

*H04L 41/0631* (2022.01)
*H04L 41/0604* (2022.01)
*H04L 43/065* (2022.01)

(52) U.S. Cl.

CPC ...... *H04L 41/0631* (2013.01); *H04L 41/0613* (2013.01); *H04L 43/065* (2013.01)

(58) Field of Classification Search

None

See application file for complete search history.

(56) References Cited

U.S. PATENT DOCUMENTS

| | | | |
|---|---|---|---|
| 9,571,394 B1 | 2/2017 | Sivaramakrishnan et al. | |
| 11,080,294 B1 * | 8/2021 | Johnston | G06F 40/205 |
| 11,243,835 B1 * | 2/2022 | Chan | G06F 11/0751 |
| 12,056,090 B1 * | 8/2024 | Sheini | G06F 16/13 |
| 2012/0233311 A1 * | 9/2012 | Parker | H04L 43/022 709/224 |

(Continued)

FOREIGN PATENT DOCUMENTS

| | | |
|---|---|---|
| CN | 113986643 A * | 1/2022 |
| WO | 2013/184846 A1 | 12/2013 |

OTHER PUBLICATIONS

Translation of CN113986643, published Jan. 28, 2022, 9 pages (Year: 2022).*

(Continued)

*Primary Examiner* — Joshua Joo

(74) *Attorney, Agent, or Firm* — Shumaker & Sieffert P.A.

(57) ABSTRACT

Techniques are described for a computing system configured to obtain a plurality of candidate logs for a plurality of layers of a computing infrastructure. The computing system may, for each candidate log of the plurality of candidate logs, map the candidate log to a log template of a plurality of log templates, wherein each log template to which a candidate log is mapped is a mapped log template. The computing system may rank mapped log templates based on properties of the mapped log templates. The computing system may select, based on the ranking, one or more candidate logs as critical logs. The computing system may output at least one of (1) an indication of the critical logs to determine a potential root cause associated with a performance issue of a network application or (2) an indication of the potential root cause associated with the performance issue of the network application.

20 Claims, 8 Drawing Sheets

(56) References Cited

U.S. PATENT DOCUMENTS

| | | | | |
|---|---|---|---|---|
| 2015/0019913 | A1 * | 1/2015 | Singh | G06F 11/0709 714/37 |
| 2016/0253229 | A1 * | 9/2016 | Sade | G06F 11/079 714/37 |
| 2018/0260268 | A1 * | 9/2018 | Madsen | G06F 11/0727 |
| 2020/0153718 | A1 * | 5/2020 | Zeng | H04L 41/0816 |
| 2022/0060371 | A1 * | 2/2022 | Paradkar | H04L 41/0677 |
| 2022/0335318 | A1 * | 10/2022 | Wang | G06F 11/3409 |
| 2022/0382776 | A1 * | 12/2022 | Alavi | G06F 16/258 |
| 2023/0177380 | A1 * | 6/2023 | Bansal | G06N 20/00 706/12 |
| 2023/0229540 | A1 * | 7/2023 | King | G06F 16/35 714/57 |
| 2024/0097967 | A1 * | 3/2024 | Hawkinson | H04L 41/0627 |
| 2024/0275687 | A1 * | 8/2024 | Arrabolu | H04L 63/1425 |

OTHER PUBLICATIONS

"Drain3", Github, Accessed on the Internet: < https://github.com/logpai/Drain3>, Jul. 17, 2022, 11 pp.

Du et al., "Deeplog: Anomaly detection and diagnosis from system logs through deep learning", Proceedings of the 2017 ACM SIGSAC Conference on Computer and Communications Security (CCS), Nov. 2017, pp. 1285-1298.

He et al., "Drain: An Online Log Parsing Approach with Fixed Depth Tree", Proceedings of the 24th International Conference on Web Services (ICWS), Jun. 2017, pp. 33-40.

Kalisch et al., "Estimating high-dimensional directed acyclic graphs with the pc-algorithm", The Journal of Machine Learning Research, vol. 8, Mar. 2007, pp. 613-636.

S. Kobayashi et al., "Mining Causality of Network Events in Log Data", IEEE Transactions on Network and Service Management, vol. 15, No. 1, Mar. 2018, pp. 53-67.

Zhu et al., "Tools and Benchmarks for Automated Log Parsing", International Conference on Software Engineering (ICSE), Jan. 3, 2019, 10 pp.

Extended Search Report from counterpart European Application No. 24215843.4 dated Jun. 25, 2025, 10 pp.

* cited by examiner

DETERMINING CRITICAL LOGS FOR NETWORK APPLICATIONS

TECHNICAL FIELD

The disclosure relates to computing systems and, more specifically, to managing network applications operating over a network.

BACKGROUND

In a typical data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements or workloads, such virtual machines or containers, are deployed and executed on an underlying compute platform of physical computing devices. Workloads may also include bare metal processes.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical central processing unit (CPU), virtualization becomes easier and more efficient. A second advantage is that virtualization provides significant control over the computing infrastructure. As physical computing resources become fungible resources, such as in a cloud-based computing infrastructure, provisioning and management of the computing infrastructure becomes easier. Thus, enterprise information technology (IT) staff often prefer virtualized compute clusters in data centers for their management advantages in addition to the efficiency and increased return on investment (ROI) that virtualization provides.

SUMMARY

In general, techniques are described for determining critical logs for troubleshooting performance issues of network applications. The techniques include a unified framework to analyze a set of cross-layer logs from an application layer, a compute layer, and a network layer of a data center or other computing infrastructure to determine, from the set of cross-layer logs, a reduced set of critical logs that are most relevant for troubleshooting performance issues of network applications. Examples of performance issue of network applications may include degradation of one or more services provided by the computing infrastructure. In some cases, the critical logs may be used to identify a possible cause of such performance issues.

In an example of the described techniques, an analytics system maps cross-layer candidate logs to log templates and determines critical logs from among the candidate logs based on properties of the log templates. The analytics system learns to generate log templates with a template mining model trained, using historical cross-layer logs, to identify cross-layer log schemas or patterns of cross-layer logs. The analytics system generates log templates for candidate logs, based on learned patterns of cross-layer logs, to significantly reduce resources (e.g., memory, processing, etc.) used for determining critical logs. Candidate logs may include cross-layer logs collected within a time period surrounding the occurrence of a performance issue of a network application. Candidate logs may include a set of cross-layer logs from nodes of each layer in a computing infrastructure identified as associated with a performance issue of a network application. In some examples, the analytics system identifies candidate logs based on a knowledge graph specifying dependencies of nodes of each layer in the computing infrastructure.

The analytics system generates log templates with the template mining model. Log templates may be generated by providing the template mining model historical log data and/or candidate logs. Log templates may include standard items of information (e.g., keywords, identifiers, addresses, variables, etc.) included in cross-layer logs. Multiple candidate logs can be mapped to the same log template. The analytics system generates an instance of a log template by mapping a candidate log to the log template. The instance of the log template may include the patterns or standard items of the log template that matches the candidate log, variable data from the candidate log mapped to the log template, as well as a timestamp of the mapped candidate log and the source (e.g., layer of the computing infrastructure) the candidate log originated from.

The analytics system selects mapped log templates according to a ranking of the mapped log templates based on properties of each of the mapped log templates. Properties of mapped log templates may include keywords included in the log template, a number of instances of the log template (i.e., number of candidate logs mapped to the log template for an analysis run), and/or whether the trained template mining model learned the log schema of the log template prior to generating the log template. In some examples, the analytics system assigns categories to log templates based on these properties. The analytics system may select a log template based on the properties of each of the mapped log templates and timestamps for instances of the log template. In some examples, the analytics system selects a log template by calculating a critical template score based on the properties of the mapped log templates. The analytics system determines the critical logs by selecting one or more instances of log templates from the selected log templates. The analytics system determines critical logs by extracting corresponding candidate logs mapped to the selected instance of log templates. The analytics system outputs the critical logs, or indications thereof, to identify root causes of performance issues of a network application. In some examples, the analytics system may perform root cause analysis based on the critical logs and output an indication of a potential root cause associated with a performance issue of a network application.

The analytics system, in some examples, considers various types of telemetry data such as cross-layer logs, cross-layer metrics, and/or network traces. The analytics system determines a structured log message for historical telemetry data (e.g., cross-layer metrics and network traces) that may be provided as training logs the template mining model uses to learn schemas or patterns for the various types of telemetry data. The analytics system collects various telemetry data that may be considered anomalous when compared to baseline behavior. The analytics system includes structured log messages for the collected telemetry data as candidate logs that are mapped to instances of log templates generated with the trained template mining model. In this way, the analytics system outputs critical logs that includes various telemetry data (e.g., key performance indicators, network traces, etc.) to pinpoint the root cause of a network application performance issue with greater accuracy.

The techniques of this disclosure may provide one or more technical advantages that can realize one or more practical applications. For example, when a network application performance degrades, logs from underlying infrastructure layers (e.g., compute layer logs, network layer logs, etc.) may need to be investigated to determine the possible root cause of the performance issues. However, investigating each layer may be highly inefficient and challenging due to each layer associated with the network application being developed and managed independently with different administrative domains and specific domain expertise. An analytics system configured to determine critical logs for each underlying infrastructure layer associated with a network application enables efficient, thorough, and simplified troubleshooting of performance issues of network applications. Critical logs determined by the analytics system significantly reduce the amount of log data that may need to be analyzed in order to conduct causality analysis to determine a root cause of performance issues associated with the network application. The analytics system may apply a dependency graph to reduce the number of cross-layer logs selected as candidate logs. The analytics system may generate log templates to categorize candidate logs based on patterns or log schemas to reduce the number of candidate logs to be selected as critical logs. In this way, the analytics system may reduce resource consumption and complexity associated with root cause determination of network application performance issues by identifying the most relevant cross-layer logs as critical logs used in causality analysis for the root cause determinations.

In one example, a method comprises obtaining, by a computing system, a plurality of candidate logs for a plurality of layers of a computing infrastructure. The method may further include for each candidate log of the plurality of candidate logs, by the computing system, mapping the candidate log to a log template of a plurality of log, wherein each log template to which a candidate log is mapped is a mapped log template. The method may further include ranking, by the computing system, the mapped log templates based on properties of each of the mapped log templates. The method may further include selecting, by a computing system and based on the ranking of the mapped log templates, one or more candidate logs corresponding to the mapped log templates as critical logs. The method may further include outputting, by the computing system, at least one of (1) an indication of the critical logs to determine a potential root cause associated with a performance issue of a network application or (2) an indication of the potential root cause associated with the performance issue of the network application.

In another example, a computing system comprises processing circuitry having access to a storage device, the processing circuitry configured to obtain a plurality of candidate logs for a plurality of layers of a computing infrastructure. The processing circuitry may be further configured to for each candidate log of the plurality of candidate logs: map the candidate log to a log template of a plurality of log templates, wherein each log template to which a candidate log is mapped is a mapped log template. The processing circuitry may be further configured to rank the mapped log templates based on properties of each of the mapped log templates. The processing circuitry may be further configured to select, based on the ranking of the mapped log templates, one or more candidate logs corresponding to the mapped log templates as critical logs. The processing circuitry may be further configured to output at least one of (1) an indication of the critical logs to determine a potential root cause associated with a performance issue of a network application or (2) an indication of the potential root cause associated with the performance issue of the network application.

In another example, computer-readable storage media comprising instructions, that when executed, causes processing circuitry to obtain a plurality of candidate logs for a plurality of layers of a computing infrastructure. The instructions may further cause the processing circuitry to for each candidate log of the plurality of candidate logs: map the candidate log to a log template of a plurality of log templates, wherein each log template to which a candidate log is mapped is a mapped log template. The instructions may further cause the processing circuitry to rank the mapped log templates based on properties of each of the mapped log templates. The instructions may further cause the processing circuitry to select, based on the ranking of the mapped log templates, one or more candidate logs corresponding to the mapped log templates as critical logs. The instructions may further cause the processing circuitry to output at least one of (1) an indication of the critical logs to determine a potential root cause associated with a performance issue of a network application or (2) an indication of the potential root cause associated with the performance issue of the network application.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
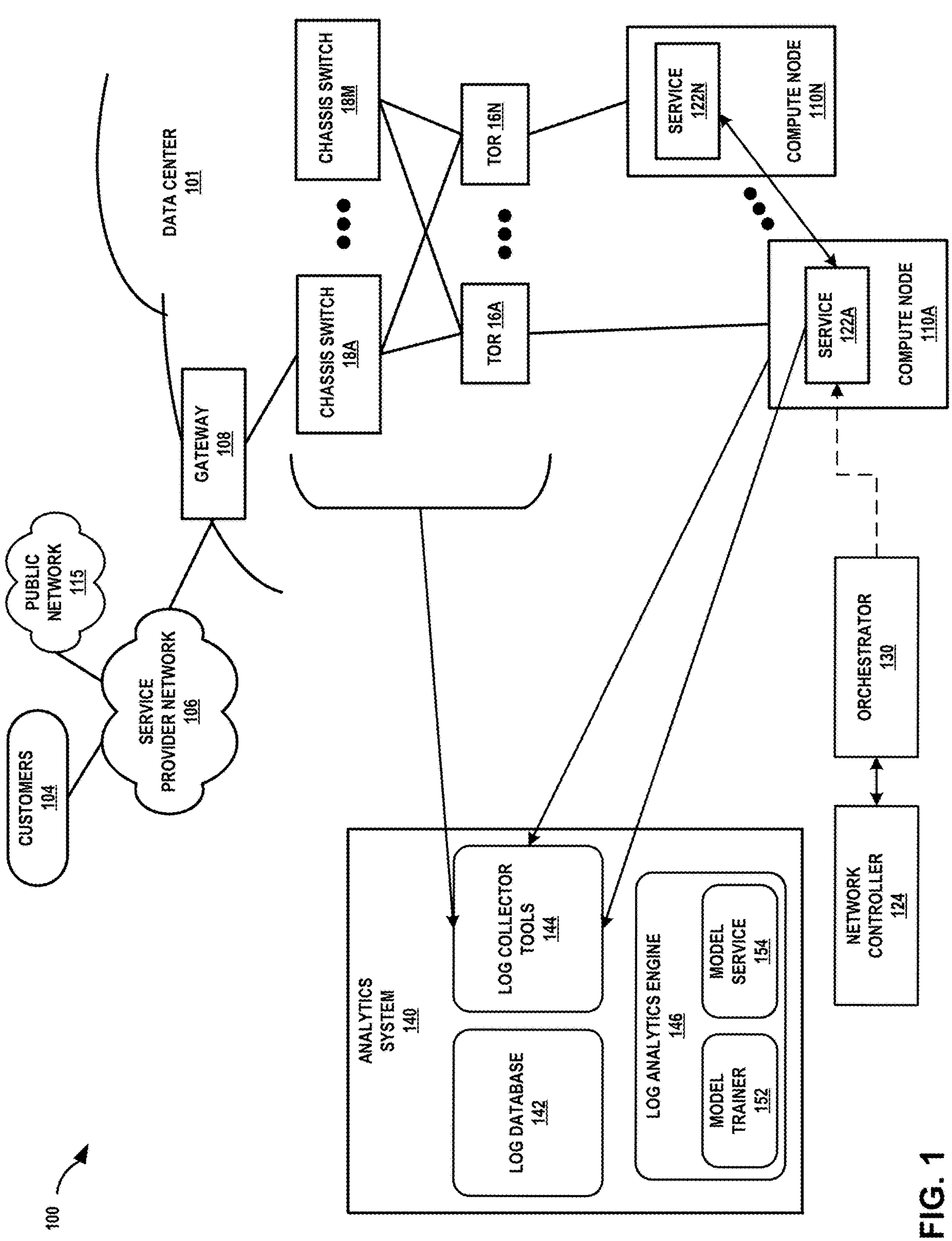
FIG. 1 is a block diagram illustrating an example computing infrastructure in which examples of the techniques described herein may be implemented.

FIG. 1 is a block diagram illustrating an example computing infrastructure 100 in which examples of the techniques described herein may be implemented. In general, data center 101 provides an operating environment for applications and services for customer sites 104 (illustrated as "customers 104") having one or more customer networks coupled to the data center by service provider network 106. Data center 101 may, for example, host infrastructure equipment, such as networking and storage systems, redundant power supplies, and environmental controls. Service provider network 106 is coupled to public network 115, which may represent one or more networks administered by other providers, and may thus form part of a large-scale public network infrastructure, e.g., the Internet. Public network 115 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 106, an enterprise IP network, or some combination thereof.

Although customer sites 104 and public network 115 are illustrated and described primarily as edge networks of service provider network 106, in some examples, one or more of customer sites 104 and public network 115 may be tenant networks within data center 10 or another data center. For example, data center 101 may host multiple tenants (customers) each associated with one or more virtual private networks (VPNs), each of which may connect with one of customer sites 104.

Service provider network 106 offers packet-based connectivity to attached customer sites 104, data center 101, and public network 115. Service provider network 106 may represent a network that is owned and operated by a service provider to interconnect a plurality of networks. Service provider network 106 may implement Multi-Protocol Label Switching (MPLS) forwarding and in such instances may be referred to as an MPLS network or MPLS backbone. In some instances, service provider network 106 represents a plurality of interconnected autonomous systems, such as the Internet, that offers services from one or more service providers.

In some examples, data center 101 may represent one of many geographically distributed data centers in which the techniques and systems described herein may be implemented. As illustrated in the example of FIG. 1, data center 101 may be a facility that provides network services, cloud services, storage services, and/or application services for customers. Data center 101 may represent an on-premises data center, a private cloud, a public cloud, a hybrid cloud, or other type of deployment. A customer of the service provider may be a collective entity such as enterprises and governments or individuals. For example, a data center may host web services for several enterprises and end users. Other exemplary services may include data storage, virtual private networks, traffic engineering, file service, data mining, scientific- or super-computing, and so on. Although illustrated as a separate edge network of service provider network 106, elements of data center 101 such as one or more physical network functions (PNFs) or virtualized network functions (VNFs) may be included within the service provider network 106 core.

Switch fabric 121 may include interconnected top-of-rack (TOR) (or other "leaf") switches 16A-16N (hereinafter "TOR switches 16) coupled to a distribution layer of chassis (or "spine" or "core") switches 18A-18N (hereinafter "chassis switches 18"). Data center 101 may include gateway 108. Gateway 108 may include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 101 may also include one or more physical network functions (PNFs) such as physical firewalls, load balancers, routers, route reflectors, broadband network gateways (BNGs), Evolved Packet Cores or other cellular network elements, and other PNFs.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Any server of data center 101 may be configured with workloads by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

In the example of FIG. 1, data center 101 includes storage and/or compute servers interconnected by one or more tiers of physical network switches and routers, with compute nodes 110A-110N (herein, "compute nodes 110") depicted as interconnected via TOR switches 16 and chassis switches 18. Compute nodes 110 may be bare metal machines and/or virtual machines within data center 101 and may also be referred to herein as "hosts" or "host devices." Compute nodes 110 may represent a computing device, such as an x86 processor-based server, configured to operate according to techniques described herein.

Compute nodes 110 may host virtual network endpoints for one or more virtual networks that operate over the physical network provided by TOR switches 16 and chassis switches 18. Although described primarily with respect to a data center-based switching network, other physical networks, such as service provider network 7, may underlay the one or more virtual networks.

Each of compute nodes 110 may host one or more workloads. The term "workload" encompasses virtual machines, containers, Kubernetes Pods, and/or other virtualized computing resources that provide an at least partially independent execution environment for applications. As shown in FIG. 1, compute node 110A hosts a workload that implements service 122A. However, a compute node 110 may execute as many workloads as is practical given hardware resource limitations of the compute node 110.

Computing infrastructure 100 implements an automation platform for automating deployment, scaling, and operations of workloads across compute nodes 110 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing workloads and/or applications and services executing on such workloads to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 100 include at least compute nodes 110, network controller 124, orchestrator 130, and analytics system 140. Workloads may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily workload hosting devices of a cluster. For example, the Kubernetes platform uses the terms "cluster master" and "minion nodes," while the Docker Swarm platform refers to cluster managers and cluster nodes.

In general, network controller 124 controls the network configuration of the data center 101 fabric to, e.g., establish one or more virtual networks for packetized communications among virtual network endpoints. Network controller 124 provides a logically and in some cases physically centralized controller for facilitating operation of one or more virtual networks within data center 101. In some examples, network controller 124 may operate in response to configuration input received from orchestrator 130 and/or an administrator/operator. Additional information regarding example operations of an example network controller 124 operating in conjunction with other devices of data center 101 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "TUNNELED PACKET AGGREGATION FOR VIRTUAL NETWORKS," each which is incorporated by reference as if fully set forth herein.

Orchestrator 130 controls the deployment, scaling, and operations of workloads across clusters of servers and providing computing infrastructure, which may include container-centric computing infrastructure. Orchestrator 130 and, in some cases, network controller 124, may implement respective cluster masters for one or more Kubernetes clusters. As an example, Kubernetes is a container management platform that provides portability across public and private clouds, each of which may provide virtualization infrastructure to the container management platform. Orchestrator 130 may represent any of the above-listed orchestration platforms, e.g., Kubernetes.

In Kubernetes, by default all workloads can communicate with all other workloads without using network address translation (NAT). In some cases, the orchestrator 130 and network controller 124 create a service virtual network and a workload virtual network that are shared by all namespaces, from which service and workload network addresses are allocated, respectively. In some cases, all workload in all namespaces that are spawned in the Kubernetes cluster may be able to communicate with one another, and the network addresses for all of the workloads may be allocated from a workload subnet that is specified by the orchestrator 130. When a user creates an isolated namespace for a workload, orchestrator 130 and network controller 124 may create a new workload virtual network and new shared service virtual network for the new isolated namespace. Workloads in the isolated namespace that are spawned in the Kubernetes cluster draw network addresses from the new workload virtual network, and corresponding services for such workloads draw network addresses from the new service virtual network.

As part of the process of creating a workload, orchestrator 130 may request that network controller 124 create respective virtual network interfaces for one or more virtual networks (indicated in the configuration data). The workload may have a different virtual network interface for each virtual network to which it belongs. Network controller 124 processes the request to generate interface configuration data for virtual network interfaces for the workload. Interface configuration data may include a container, pod, or other workload unique identifier and a list or other data structure specifying, for each of the virtual network interfaces, network configuration data for configuring the virtual network interface. Network configuration data for a virtual network interface may include a network name, assigned virtual network address, MAC address, and/or domain name server values.

Each of services 122A-122N (collectively, "services 122") is deployed using a workload. Services 122 may each represent or include one or more containers deployed by a container orchestration system. One or more of services 122 may collectively implement a network application that includes a collection of one or more services 122. For example, a network application may include services 122A-122N. Each of services 122 may provide or implement one or more services, and where services 122 represent Pods or other container deployments, the one or more services are containerized services or "microservices". Compute nodes 110 may host services for multiple different network applications each distributed with one or more services. In some examples, services of a network application are distributed across compute nodes managed by any combination of service providers, enterprises, or other entities. Such compute nodes may be located in multiple different data centers, on-prem, or in private, public, or hybrid clouds.

Orchestrator 130 may include a scheduler to schedule services 122 to compute nodes 110. In general, orchestrator 130 may manage the placement of each of services 122 to compute nodes 110 according to scheduling policies, the amount of resources requested for the service, and available resources of compute nodes 110. Compute node resources considered by orchestrator 130 when assigning services 122 to compute nodes 110 include CPU-related resources (e.g., cores, CPU/core utilization), memory-related resources (available main memory, e.g., 2 GB), ephemeral storage, and user-defined extended resources. In Kubernetes, the scheduler is known as kube-scheduler.

Services 122 may have distinct performance requirements that need to be met within a highly dynamic application execution environment. In such an environment, application performance is the artifact of dynamics of different resources such as worker node resources; network resources (e.g., bandwidth, latency, loss, jitter, firewall policies), network policies, and the communication graph among different services of a network application; as well as the performance of external services such as authentication and external cloud services.

Services 122 may communicate with each other as part of providing functionality for a network application. Each service of service 122 may provide functionality for one or more components of a network application. For example, service 122A may provide functionality for one part of the network application, while service 122N provides functionality for a different part of the network application.

Services 122 may communicate with each other using calls, such as remote procedure calls (RPCs). Services 122 may communicate with each other along a chain of RPCs to provide the functionality of the network application. For example, service 122A may communicate with service 122N and send RPCs to service 122N as part of providing functionality of the network application.

Services 122 may call each other in a path of service calls. For example, service 122B may call service 122C, which then calls service 122F. As part of providing the functionality of a network application, a series of services may call each other in turn. In some cases, service 122A is an entry endpoint service, service 122N is a terminating endpoint service, and one or more other services are called between service 122A and service 122N for an end-to-end call path for the network application.

A service request arriving at an entry point (aka endpoint) in distributed system undergoes multiple "hops" through numerous microservice operations before being fully serviced. The life of a request results in complex microservice interactions. These interactions are deeply nested, asynchronous, and invoke numerous other downstream operations. As a result of this complexity, it may be very hard to identify which underlying service(s) contribute to the overall end-to-end latency experienced by a top-level request.

Analytics system 140 may execute as a network administrator application on one or more devices of data center 101. Analytics system 140 may however be deployed separately from data center 101.

Analytics system 140 may be integrated as part of a telemetry system, a root cause determination system, or any system a network administrator may implement to analyze log data for computing infrastructure 100. In the example of FIG. 1, analytics system 140 includes log analytics engine 146, log collector tools 144, and log database 142.

In accordance with the techniques described herein, analytics system 140 determines a set of critical logs from cross-layer system logs of the multiple layers of computing infrastructure 100. Cross-layer system logs may include logs from different layers of computing infrastructure 100, such as logs from an application layer (e.g., service 122), logs from a compute layer (e.g., compute nodes 110), logs from a network layer (e.g., chassis switches 18 and TOR switches 16). Analytics system 140 may output critical logs, consisting of cross-layer logs, for root cause analysis of performance issues related to network applications. Network applications may include any combination of services or microservices for a data center that rely on network resources to perform particular functions such as enabling communication, data sharing, and collaboration among network devices. In the example of FIG. 1, a network application may include service 122A through service 122N or any combination of services 122. Log analytics engine 146 of analytics system 140 may obtain cross-layer logs associated with services 122 to output critical logs using a machine learning model, such as model service 154. Model service 154 may include a machine learning model (e.g., a template mining model) trained, by model trainer 152, to identify patterns or schemas of cross-layer logs based on historical log data. Although illustrated as internal to log analytics engine 146, model service 152 may include a template mining model trained offline at an external computing system or computing device.

Model trainer 152 may obtain historical log data for layers of computing infrastructure 100 to train a machine learning model of model service 154 to identify patterns of cross-layer logs. For example, model trainer 152 may obtain historical log data for an application layer, a compute layer, and a network layer of computing infrastructure 100 to train a machine learning model as a trained template mining model that identifies schemes of keywords, functions, addresses, variables, identifiers, or other information included in the different types of system logs.

Model trainer 152 may generate log templates based on the historical log data. Log templates include common schemes output by the trained template mining model, such as an outline or representation of key terms, functions, variables, identifiers, addresses, or other standard information included in a system log from multiple layers of a data center. Model trainer 152 may provide the plurality of generated log templates to model service 154. Model service 154 may map candidate logs to the log templates to reduce the number of data items to be analyzed.

In some instances, model service 154 may execute the trained template mining model to generate the log templates. In some instances, model service 154 may store log templates generated by the trained machine learning model.

Log analytics engine 146 may apply model service 154 to map candidate logs to log templates. Log analytics engine 146 may obtain cross-layer system logs as candidate logs that may be included in the set of critical logs. Model service 154 of log analytics engine 146 may apply the trained template mining model to generate a plurality of log templates for the candidate logs. Model service 154 may generate instances of the log templates by mapping a candidate log to a log template of the plurality of log templates. Model service 154 may map multiple candidate logs to one log template based on whether the candidate logs match a pattern or scheme included in the log template. Each log template to which one or more candidate logs are mapped is a mapped log template. An instance of a log template includes schemes identified by the trained template mining model, as well as a timestamp of the candidate log mapped to the log template and the source (e.g., application layer, compute layer, network layer, etc.) the candidate log originated from. Log analytics engine 146 maps candidate logs to log templates to reduce the number of data items that are analyzed to determine the set of critical logs. In some instances, model trainer 152 may retrain the template mining model of model service 154 with the candidate logs for future log template generation and critical log determination.

Log analytics engine 146 determines the critical logs by selecting one or more mapped log templates. To determine the critical logs from among the mapped log templates, log analytics engine 146 applies a heuristic to properties of the log templates. Example heuristics include considering time recency in view of various log template categories and critical template scores. Both heuristics involve log analytics engine 146 selecting one or more mapped log templates based on a category assigned to each log template, as well as other factors such as timestamps included in instances of the log template or keywords included in the mapped log template. These are described in further detail below with respect to FIGS. 4A-4B.

Log analytics engine 146 may determine which of the candidate logs are critical logs based on properties of each of the mapped log templates. Properties of mapped log templates may include keywords included in the log template, a number of instances of the log template, and/or whether the trained template mining model learned the log schema of the log template prior to generating the log template. Log analytics engine 146 determines the critical logs based on the mapping of candidate logs to the selected log templates. For example, log analytics engine may extract corresponding candidate logs from one or more instances of the selected log templates as the set of candidate logs used in root cause analysis of network application performance issues.

In some instances, log analytics engine 146 may determine a potential root cause for performance issues of a network application based on the set of critical logs, and output an indication of the potential root cause. In some examples, log analytics engine 146 may output an indication of the critical logs to an external computing system configured to perform causality analysis for root cause determinations of performance issues of network applications.

Log collector tools 144 may obtain cross-layer, system logs associated with computing infrastructure 100. For example, log collector tools 144 may obtain logs from an application layer associated with service 122A, a compute layer associated with compute node 110A, and a network layer associated with chassis switches 18 and TOR switches 16A.

Log collector tools 144 may include software tools (e.g., FluentBit and FluentD) configured to collect, filter, format, and tag logs and metrics from multiple sources (e.g., an application layer, a compute layer, and a network layer). Log collector tools 144 may ingest and process system logs from layers of computing infrastructure 100. For example, log collector tools 144 may add metadata (e.g., tags) to each log that identifies the time and source of the log data included in the log. Log collector tools 144 may prepend each collected log with a corresponding timestamp of when the log was generated. Log collector tools 144 may append each collected log with the corresponding source or layer the log was collected from. Log collector tools 144 may store the ingested and processed logs in log database 142. Log collector tools 144 may store the logs on specific indices of log database 142.

Log database 142 may include a database maintained by analytics system 140 and stored to storage media. Analytics system 140 may store data regarding system logs, performance metrics, traces, or the like associated with computing infrastructure 100. Analytics system 140 may store one or more maps or graphs of dependencies and network configurations for nodes of layers in log database 142. Log database 142 may include an OpenSearch database or other type of database that may enable querying various types of data.

Log analytics engine 146 may obtain candidate logs from log database 142. In some instances, log analytics engine 146 may obtain candidate logs as each systems log generated over a certain period of time (e.g., a thirty minute period of time leading up to a performance issue of service 122A). In some instances, log analytics engine 146 may obtain candidate logs as a reduced set of system logs generated over the period of time using a knowledge graph specifying particular nodes from each layer of computing infrastructure 100 associated with performance issues of a network application.

The techniques of this disclosure may provide one or more technical advantages. For example, by determining critical logs and thereby reducing the number of logs that must be analyzed, log analytics engine 146 may assist with efficiently determining a potential root cause of performance issues of a network application based on candidate logs. Log analytics engine 146 may identify candidate logs from a large number of collected system logs from multiple layers of computing infrastructure 100 in a low-data manner. Log analytics engine 146 may reduce the number of candidate logs to be analyzed by applying a knowledge graph identifying nodes of each layer associated with a performance issue of a network application (e.g., any of services 122 of the application layer, compute nodes 110 of the compute layer, and TOR switches 16 and chassis switches 18 of the network layer). Log analytics engine 146 may train and apply a machine learning model to classify each candidate log into log templates to categorize candidate logs based on patterns of schemas of the logs. In this way, log analytics engine 146 may select one or more candidate logs based on a ranking or scoring of the log templates rather than ranking or scoring each individual candidate log. By log analytics engine 146, or an external system, performing causality analysis to determine a potential root cause of performance issues associated with a network application with the selected candidate logs that have been determined to be critical, log analytics engine 146 may reduce the compute time needed to effectively analyze the candidate logs and reduce the amount of resources (e.g., processing power, memory storage, etc.) associated with determinations of root causes for performance issues of a network application.

Figure 2:
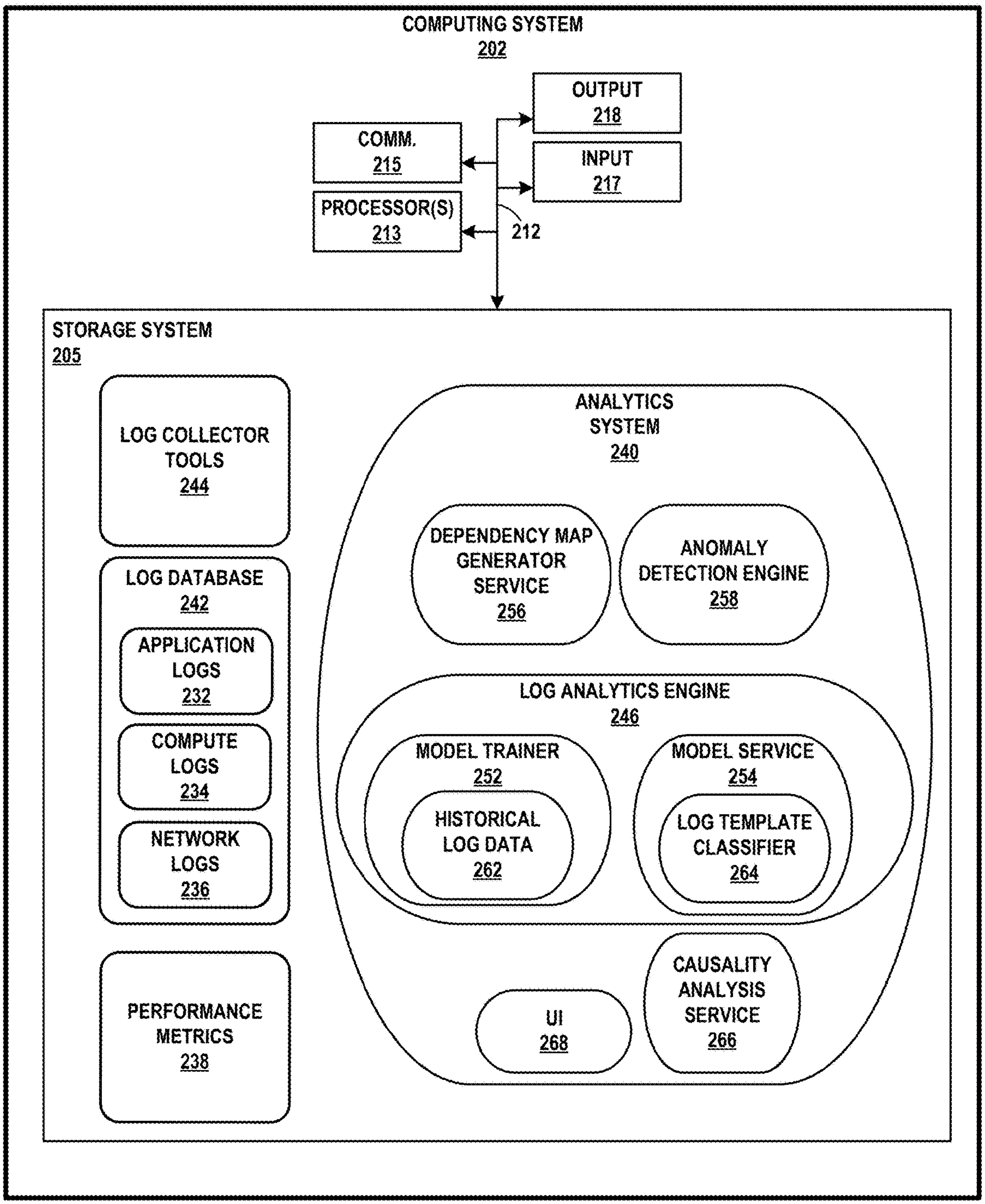
FIG. 2 is a block diagram illustrating an example computing system, in accordance with techniques described in this disclosure.

FIG. 2 is a block diagram illustrating an example computing system, in accordance with techniques described in this disclosure. Computing system implements an example instance of analytics system 240 of FIG. 1. Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more processor(s) 213, communication units 215 (illustrated as COMM. 215), one or more input devices 217, one or more output devices 218, and one or more storage devices of storage system 205. Storage system 205 includes analytics system 240 and orchestrator 130. Communication channels 212 may interconnect one or more of the devices, modules, storage areas, or other components of computing system 202 to enable inter-component communications (physically, communicatively, and/or operatively). In some examples, communication channels 212 may represent one or more of a system bus, a network connection, an inter-process communication data structure, or any other method for communicating data.

One or more of processor(s) 213 may implement functionality and/or execute instructions associated with computing system 202 or associated with one or more modules illustrated herein and/or described below. One or more of processor(s) 213 may be, may be part of, and/or may include processing circuitry that performs operations in accordance with one or more aspects of the present disclosure. Examples of processor(s) 213 include microprocessors, application processors, display controllers, auxiliary processors, one or more sensor hubs, and any other hardware configured to function as a processor, a processing unit, or a processing device. Computing system 202 may use one or more processor(s) 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Such communications may adhere to, implement, or abide by appropriate protocols, including Transmission Control Protocol/Internet Protocol (TCP/IP), Ethernet, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of storage system 205 within computing system 202 may store information for processing during operation of computing system 202. Storage system 205 may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and storage system 205 may retrieve, store, and/or execute the instructions and/or data of one or more applications, modules, or software. Processors 213 and/or storage devices of storage system 205 may also be operably coupled to one or more other software and/or hardware components, including, but not limited to, one or more of the components of computing system 202 and/or one or more devices or systems illustrated as being connected to computing system 202.

Processors 213 may execute analytics system 240. Analytics system 240 may be an application, platform, or other form type of process configured to analyze. For example, analytics system 240 may monitor the performance of various network applications and underlying services such as services 122 illustrated in FIG. 1.

In accordance with the techniques described herein, analytics system 240, as part of monitoring services of network applications, may determine a set of critical logs used for root cause analysis of performance issues of network applications. Log analytics engine 246 of analytics system 240 may train a machine learning model to identify patterns of standard information in cross-layer logs for log template generation. Model trainer 252 may train the machine learning model with historical log data 262. Historical log data 262 may include cross-layer system logs during normal system performance and/or candidate logs obtained during previous critical log determinations. Model trainer 252 may generate log templates with the template mining model. In some examples, model trainer 252 may provide the log template to model service 254 to map to candidate logs. Although illustrated as internal to computing system 202, the machine learning model may be trained offline at an external system.

Model service 254 of log analytics engine 246 may include the machine learning model trained by model trainer 252. Log template classifier 264 of model service 254 may include indications of a frequency or number of instances a log template has been mapped to candidate logs. Log template classifier 264 may include indications of instances of log templates comprising patterns of a log template and corresponding timestamps and sources of candidate logs mapped to the log template. Log template classifier 264 may store indications of keywords and a significance of the keywords (e.g., a keyword of "ERROR" would receive a high significance value or a keyword of "GET" would receive a low significance value). Log template classifier 264 may store log templates generated during the training phase or during previous critical log determinations. Model service 254 may apply stored indications of log template classifier 264 to assign a category to log templates generated for candidate logs.

Anomaly detection engine 258 of analytics system 240 may determine performance issues of network applications. Anomaly detection engine 258 may determine performance issues (e.g., degradation in response time or latency) for network applications, such as services 122 of FIG. 1. For example, anomaly detection engine 258 may determine a performance issue of a network application based on performance data included in performance metrics 238. Performance metrics 238 may include key performance indicators (KPIs) monitored for layers of computing infrastructure 100. For example, performance metrics 238 may include application KPIs, compute KPIs, and network KPIs configured to measure latency, jitter, packet loss, throughput, network speed, bandwidth, network availability, packet duplication, packet reordering, packet rate, interface flap, processor utilization, memory utilization, user quality experience, network congestion, round-trip time, network utilization, network error rate, network response time, or the like throughout layers of computing infrastructure 100. Anomaly detection engine 258 may determine a performance issue based on thresholds of KPIs included in performance metrics 238.

In some instances, anomaly detection engine 258 may determine a performance issue that is not triggered by KPI values included in performance metrics 238. For example, anomaly detection engine 258 may determine a performance issue of a network application based on feedback from a user or administrator. Anomaly detection engine 258 may generate anomaly logs based on KPIs included in performance metrics 238 to determine whether additional or different KPIs for a particular layer should be measured to detect the performance issue. Anomaly detection engine 258 may generate anomaly logs by converting time series data of performance metrics 238 into certain message events. Anomaly detection engine 228 may provide the anomaly logs to log analytics engine 246. Log analytics engine 246 may apply model trainer 252 to historical log data 262, that includes historical anomaly logs, to train a machine learning model of model service 254 to generate templates for anomaly logs. Log analytics engine 246 may apply model service 254 to determine whether to include anomaly logs as part of the set of critical logs. In this way, log analytics engine 246 may output critical logs that concurrently consider different types of telemetry such as logs, performance metrics, traces to help pinpoint a potential cause of performance issues with higher accuracy.

Dependency map generator service (DMGS) 256 may include a knowledge graph identifying dependent nodes for each layer associated with a network application. DMGS 256 may include an application tracing tool or toolkit (e.g., Jaegar or OpenTelemetry). DMGS 256 may instrument the network application that includes services 122 and obtain call pathing information for a given time window. DMGS 256 may use the call pathing information to determine call paths among services 122. DMGS 256 may map or graph nodes from an application layer to other nodes of the application layer and/or nodes from a compute layer. DMGS 256 may map or graph nodes from the compute layer to nodes of the application layer and/or a network layer. DMGS 256 may map or graph nodes from the network layer to nodes of the compute layer or other nodes of the network layer. Log analytics engine 246 may apply the knowledge graph included in DMGS 256 to reduce the number of candidate logs based on dependent nodes from the anomalous application layer perspective. For example, log analytics engine 246 may determine candidate logs based on nodes in the knowledge graph associated with one or more nodes (e.g., microservices) of the application experiencing performance issues.

Log collector tools 244 may include software tools for collecting telemetry data from various sources throughout computing infrastructure 100. Log collector tools 244 may collect telemetry data such as logs, traces, and performance metrics. Log collector tools 244 may store time series data associated with KPIs of various layers in performance metrics 238. Log collector tools 244 may index logs from various layers in log database 242. For example, log collection tools 244 may index logs from an application layer in application logs 232 of log database 242. Log collection tools 244 may index logs from a compute layer in compute logs 234. Log collection tools 244 may index logs from a network layer in network logs 236.

Causality analysis service 266 may apply critical logs determined by log analytics engine 246 to determine a potential root cause of performance issues. For example, causality analysis service 266 may implement a form of Granger causality analysis with the critical logs to determine a potential root cause of performance issues of a network application. Causality analysis service 266 may efficiently determine potential root causes due to the critical logs including a reduced set of relevant logs across various layers associated with the network application experiencing performance issues.

User interface ("UI") 268 may generate user interfaces that include one or more visual elements. For example, UI 268 may generate a user interface that includes one or more visual elements, with each visual element associated with one or more services and network devices. In another example UI 268 may generate a user interface that includes a visual representation of a DAG of the network infrastructure. In yet another example, UI 268 may generate a user interface that includes a visual element associated with an alert indicating that a network device underlying the critical path is experiencing anomalous behavior.

Analytics system 240 may output a user interface via output devices 218. Analytics system 240 may output a user interface generated by UI 268 for display to a user. For example, UI 268 may generate a user interface cause output devices 218 to display a user interface that includes a visual indicator of an alert regarding a device experiencing anomalous behavior. In another example, UI 268 may generate a user interface that includes a visual representation of a DAG of the calls between services and the underlying network infrastructure. UI 268 may generate a user interface that prompts a user to define a time period for candidate log determinations, KPIs to monitor, a knowledge graph, or other aspects of the techniques described herein.

Figure 3A:
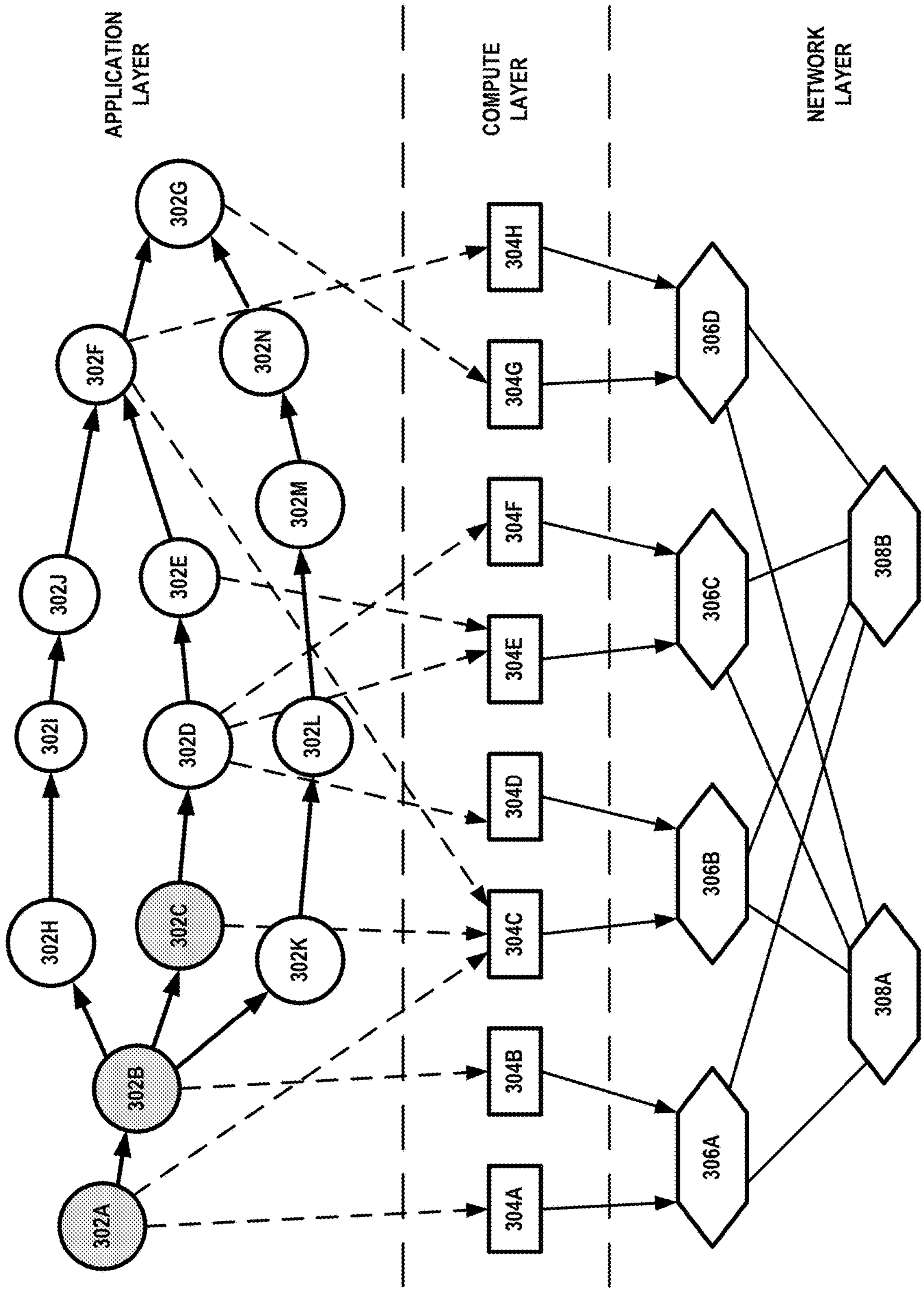
FIG. 3A is a block diagram illustrating an example knowledge graph of network layer nodes associated with a network application, in accordance with one or more techniques of this disclosure.

FIG. 3A is a block diagram illustrating an example knowledge graph of network layer nodes associated with a network application, in accordance with one or more techniques of this disclosure. FIG. 3A will be discussed with respect to FIG. 2 for example purposes only. Analytics system 240 may maintain a knowledge graph that includes mappings of cross-layer dependencies of application layer nodes, compute layer nodes, and network layer nodes in a data center environment (e.g., data center 101 of FIG. 1). In the example of FIG. 3A, analytics system 240 may determine a knowledge graph (e.g., application dependency graph) that includes service nodes 302A-302G (collectively referred to herein as, "service nodes 302" or "application nodes 302"), compute nodes 304A-304H (collectively referred to herein as, "compute nodes 304"), TOR switches 306A-306D (collectively referred to herein as, "TOR switches 306"), and chassis switches 308A and 308B (collectively referred to herein as, "chassis switches 308").

Analytics system 240 may determine a knowledge graph with an application layer including service nodes 302, a compute layer including compute nodes 304, and a network layer including TOR switches 306 and chassis switches 308. In some instances, service nodes 302 may correspond to multiple, distributed services or network applications. In some examples, each service node of service nodes 302 may include multiple instances that are hosted on distributed compute nodes 304 in the compute layer of the knowledge graph. Each of compute nodes 304 may include bare metal servers, computing devices, virtual machines, or the like. Compute nodes 304 may be connected to a TOR switch of TOR switches 306 in the network layer. TOR switches 306 may be coupled to one or more chassis switches of chassis switches 308 in the network layer.

In accordance with the techniques described herein, analytics system 240 may obtain candidate logs for each node of the knowledge graph. Analytics system 240 may obtain candidate logs for nodes of the knowledge graph responsive to determining performance issues, anomalies, or unexpected behavior of one or more service nodes 302. In the example of FIG. 3A, analytics system 240, or more specifically anomaly detection engine 258, may detect performance issues with service node 302A, 302B, and 302C (e.g., unexpected behavior of key performance indicator metrics of service nodes 302A, 302B, and 302C). Analytics system 240 may obtain cross-layer logs from each node within a period of time leading up to the detection of performance issues associated with service nodes 302A, 302B, 302C. For example, analytics system 240 may determine performance issues associated with service nodes 302A, 302B, 302C at a time equal to "2:00." Analytics system 240 may obtain logs for each node with a timestamp indicating the log was generated within the time period between, and including, "1:30" to "2:00."

Analytics system 240 may apply log collection tools 244 to obtain system logs for each node of the knowledge graph. Analytics system 240 may apply log collection tools 244 to obtain application logs for service nodes 302 from an application layer log collector, compute nodes 304 from a compute layer log collector, TOR switches 306 from a network layer log collector, and chassis switches 308 from a network layer log collector.

Analytics system 240 may apply log collection tools 244 to ingest and process system logs obtained from telemetry collectors to filter, format, and tag log data across layers. For example, analytics system 240 may process application layer logs (e.g., logs for service nodes 302) by adding or appending log data with tags such as "Application: Istio" indicating the log corresponds to an application layer log collected using an Istio service mesh. In another example, analytics system 240 may use an application performance monitoring tool of log collection tools 244 to collect logs and tag the log data with "Application: APM: NewRelic" as the source of the log data. Analytics system 240 may tag network log data with source tags such as "Network: Physical: Apstra" for physical networks managed by Juniper Apstra fabric manager or "Network: Virtual: Contrail" for virtual networks monitored by Juniper Contrail. Analytics system 240 may prepend each log with a respective timestamp corresponding to a time the log was generated. Analytics system 240 may store the ingested cross-layer logs in log database 242 as candidate logs for analyzing by log analytics engine 246 to determine critical logs.

Figure 3B:
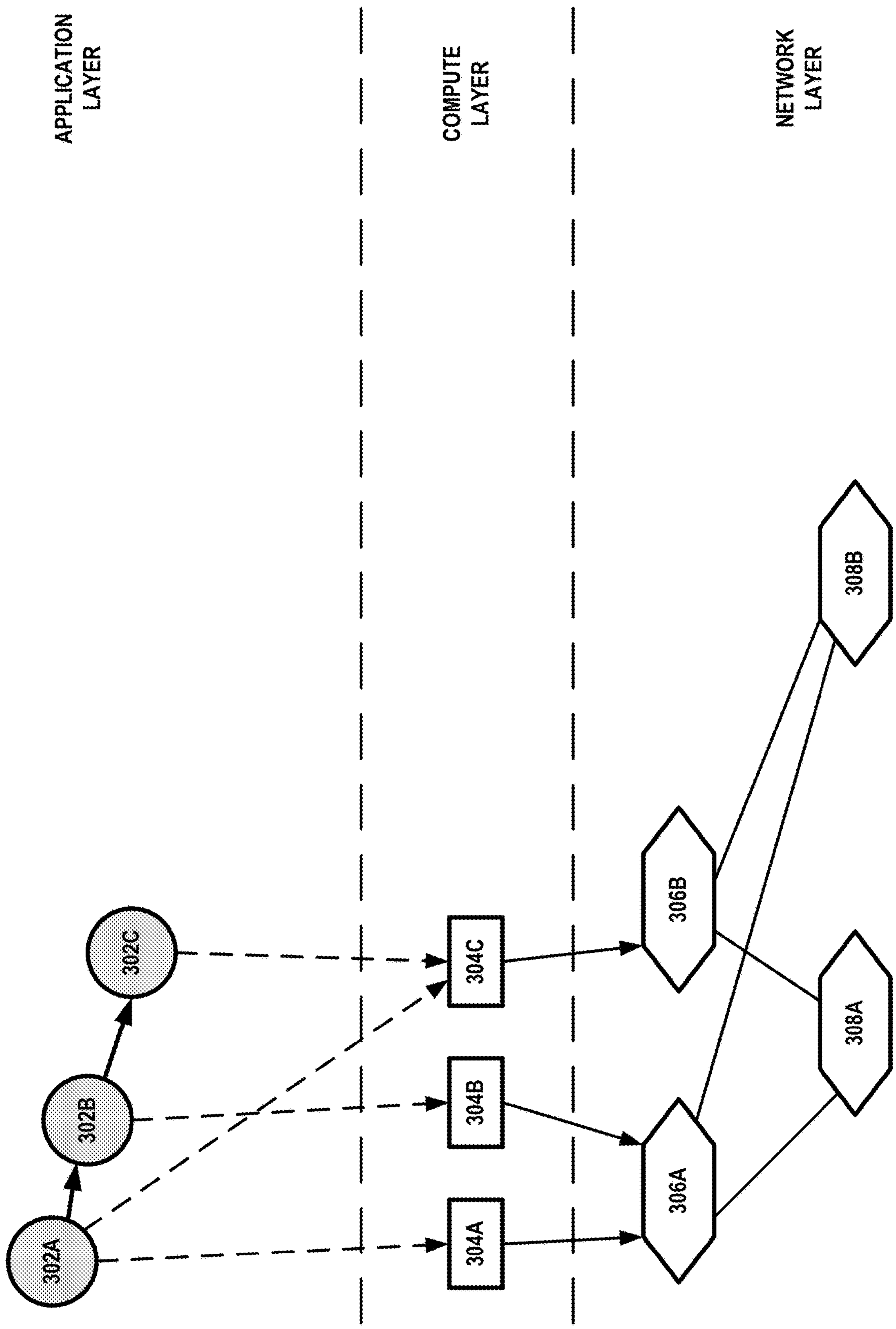
FIG. 3B is a block diagram illustrating an example knowledge graph of network layer nodes associated with a performance issue of a network application, in accordance with one or more techniques of this disclosure.

FIG. 3B is a block diagram illustrating an example knowledge graph of network layer nodes associated with a performance issue of a network application, in accordance with one or more techniques of this disclosure. Analytics system 240 may prune or limit the knowledge graph used to obtain candidate logs to reduce the number of candidate logs stored in log database 242 and processed by log analytics engine 246. Analytics system 240 may apply anomaly detection engine 258 to determine performance issues (e.g., latency) associated with service nodes 302A, 302B, and 302C. Analytics system 240 may apply dependency map generator service 256 to prune a knowledge graph (e.g., the knowledge graph of FIG. 3A) from the perspective of anomalous application layer nodes (e.g., generate a subgraph to include nodes associated with service nodes experiencing the performance issues). In the example of FIG. 3B, analytics system 240 may prune the knowledge graph of FIG. 3A to include service nodes 302A, 302B, 302C, compute nodes 304A, 304B, 304C, TOR switches 306A, 306B, and chassis switches 308A, 308B. Analytics system 240 may collect, filter, format, and tag logs based on the nodes included in the pruned knowledge graph of FIG. 3B. Analytics system 240 may store ingested cross-layer logs for the reduced number of nodes as candidate logs. In this way, log analytics engine 246 may analyze a fewer number of candidate logs, compared to the number of candidate logs ingested according to the knowledge graph of FIG. 3A, without impacting the accuracy of resulting critical logs.

Figure 4A:
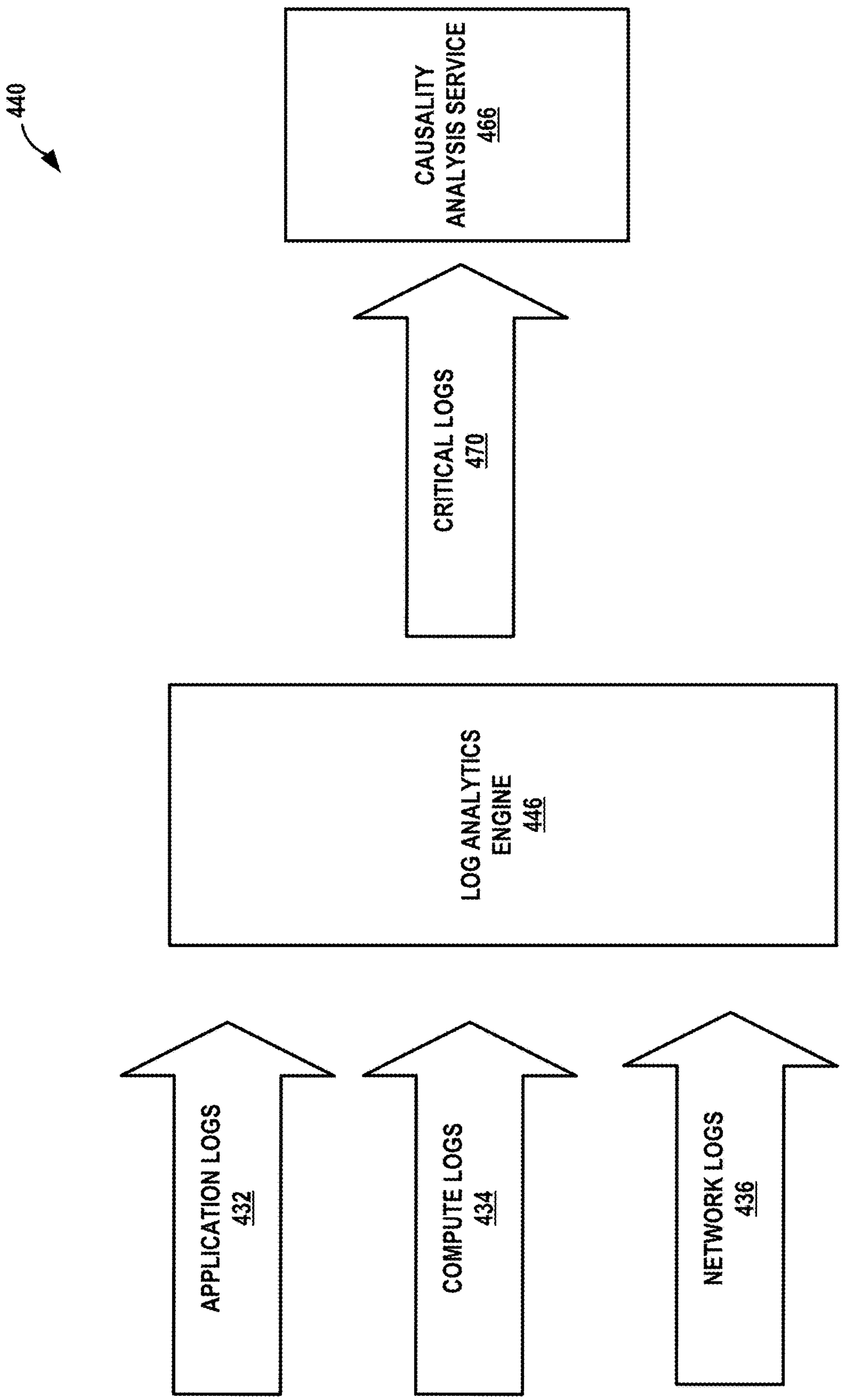
FIG. 4A is a block diagram illustrating an example of an analytics system for determining critical logs, in accordance with one or more techniques of this disclosure.

FIG. 4A is a block diagram illustrating an example of an analytics system for determining critical logs, in accordance with one or more techniques of this disclosure. FIG. 4A may be described with respect to FIG. 2 for example purposes only. In the example of FIG. 4A, application logs 432, compute logs 434, network logs 436, log analytics engine 446, and causality analysis service 466 may include example implementations of application logs 232, compute logs 234, network logs 236, log analytics engine 246, and causality analysis service 266 of FIG. 2, respectively.

In some examples, log analytics engine 446 may determine critical logs 470 responsive to indications of degraded performance from a network application. Log analytics engine 446 may determine a subset across application logs 432, compute logs 434, and network logs 436 as critical logs 470 based on the techniques described herein. Critical logs 470 may include the most relevant logs from each of application logs 432, compute logs 434, and network logs 436 to troubleshoot performance issues of network applications efficiently and effectively. In some instances, log analytics engine 446 may determine candidate logs from each of application logs 432, compute logs 434, and network logs 436 as logs from each node of a knowledge graph or a reduced set of logs from each node identified as being associated with performance issues of network applications.

Log analytics engine 446 may apply a template mining model to generate log templates for the candidate logs. In some instances, log analytics engine 446 may generate log templates during the training of the template mining model. Log analytics engine 446 may map candidate logs to log templates generated by providing the trained template mining model the candidate logs. Log analytics engine 446 maps candidate logs to log templates to reduce the number of logs to be searched for, collected, processed, and analyzed by orders of magnitude. Log analytics engine 446 may assign different log template categories to the mapped log templates (e.g., log templates that have been mapped to candidate logs). For example, log analytics engine 446 may classify mapped log templates into three different log template categories based on critical keywords or a frequency or rarity a log template mapped to candidate logs (e.g., a number of instances of the log template). Log analytics engine 446 may classify mapped log templates into log template categories that may include a first category for well-known log templates, a second category for rarely occurring log templates, and a third category for log templates unrecognized by the trained template mining model. In some examples, log analytics engine 446 may assign mapped log template categories to log templates sequentially. That is, log analytics engine 446 may assign a first log template category to log templates based on critical keywords, then assign a second log template category to remaining log templates based on a frequency corresponding log templates have been mapped to candidate logs, and then assign a third log template category to remaining log templates based on log templates that are unrecognized by the trained template mining model (e.g., the trained template mining model has not yet learned the scheme or pattern of the log template).

Log analytics engine 446 may classify mapped log templates by searching log templates for critical keywords. Log analytics engine 446 may automatically mark candidate logs, associated with a mapped log template, for further analysis (e.g., classify as category one) responsive to determining the mapped log template includes keywords that strongly correlate with errors (e.g., failure, error, crash, etc.). In some instances, log analytics engine 446 may search for keywords inside of a sample log with unmasked log values. Log analytics engine 446 may search corresponding sample logs for candidate logs that may include critical keywords that are masked to variable tokens. In response to determining a log template that mapped to one or more candidate logs includes critical keywords, log analytics engine 446 may assign the log template to a first category or classification of well-known log templates that historically indicate anomalous behavior.

Log analytics engine 446 may classify mapped log templates by searching for log templates that are rarely mapped amongst candidate logs. Log analytics engine 446 may classify mapped log templates by counting the number of candidate logs that map to each log template generated by the trained template mining model (e.g., the number of instances of log templates). Log analytics engine 446 may determine a frequency or rarity of log templates by counting the number of candidate logs that map to certain log templates within an analysis window (e.g., the period of time corresponding to timestamps of candidate logs). In response to determining a log template rarely maps to one or more candidate logs, log analytics engine 446 may assign the mapped log template to a second category corresponding to rare network events.

Log analytics engine 446 may classify mapped log templates based on whether log templates have been recognized by the trained template mining model. The trained template mining model may be trained to identify patterns of logs based on historical log data. Log analytics engine 446 may track log templates generated based on the template mining model identifying patterns of historical log data and candidate logs. Log analytics engine 446 may categorize unrecognized mapped log templates generated for candidate logs because the historical training data used to train the template mining model includes log data for applications and infrastructure that is well performing. In response to determining a mapped log template has not previously been learned, log analytics engine 446 may assign the log template to a third category of unrecognized log templates that may be considered anomalous and possibly correlated with abnormal system behavior. Once log analytics engine 446 determines a log template has been mapped to a candidate log, log analytics engine 446 may track the mapped log template for future use and potential classification as the first or second category in subsequent analysis. In some examples, a candidate log with a scheme or pattern that is unrecognized by the template mining model may itself be the log template assigned to this category.

Log analytics engine 446 may select candidate logs as critical logs 470 based at least in part on categories assigned to mapped log templates. Log analytics engine 446 may determine critical logs 470 by ranking or scoring mapped log templates based on multiple factors such as categories assigned to mapped log templates, timestamps of corresponding candidate logs, and/or keywords included in candidate logs and corresponding log templates.

In one example, log analytics engine 446 may determine critical logs 470 with timestamps of candidate logs and categories assigned to mapped log templates. Log analytics engine 446 may rank mapped log templates in chronological order with respect to the detection of performance issues of network applications. For example, log analytics engine 446 may rank mapped log templates based on timestamps of corresponding instances of log templates or candidate logs indicating a time closest to the time a performance issue of a network application was determined. Log analytics engine 446 may uniformly select mapped log templates from different log template categories while considering timestamps of instances of the log template (e.g., discrete mapping of a candidate log to a log template). Log analytics engine 446 may, for each mapped log template category, give higher preference to instances of log templates with timestamps indicating a time nearest to the time of the performance issue.

In this example, log analytics engine 446 may, for each mapped log template, determine a candidate log with a timestamp indicating a time closest to the determination of the performance issue (referred to herein as the "most recent timestamp"). For example, log analytics engine 446 may map log templates to candidate logs to troubleshoot a network application performance issue at time equal to "T." Log analytics engine 446 may map a first log template to a first candidate log with a timestamp of "T1" (e.g., 1 minute before time "T"), a second candidate log with a timestamp of "T2" (e.g., 2 minutes before time "T") and a third candidate log with a timestamp of "T3" (e.g., 3 minutes before time "T"). Log analytics engine 446 may determine the first candidate log as being the candidate log of the first log template with the most recent timestamp. Similarly, log analytics engine 446 may map a second log template to a fourth candidate log with a timestamp of "T4" (e.g., 20 seconds before time "T") and a fifth candidate log with a timestamp of "T5" (e.g., 30 seconds before time "T"). Log analytics engine 446 may determine the fourth candidate log as being the candidate log of the second log template with the most recent timestamp. Similarly, log analytics engine 446 may map a third log template to a sixth candidate log with a timestamp of "T6" (e.g., 1 minute before time "T") and a seventh candidate log with a timestamp of "T7" (e.g., 2 minutes before time "T"). Log analytics engine 446 may determine the sixth candidate log as being the candidate log of the third log template with the most recent timestamp. Similarly, log analytics engine 446 may map a fourth log template to an eighth candidate log with a timestamp of "T8" (e.g., 2 minutes before time "T"), a ninth candidate log with a timestamp of "T9" (e.g., 4 minutes before time "T"), and a tenth candidate log with a timestamp of "T10" (e.g., 6 minutes before time "T"). Log analytics engine 446 may determine the eighth candidate log as being the candidate log of the fourth log template with the most recent timestamp. Similarly, log analytics engine 446 may map a fifth log template to an eleventh candidate log with a timestamp of "T11" (e.g., 1 minute before time "T"). Log analytics engine 446 may determine the eleventh candidate log as being the candidate log of the fifth log template with the most recent timestamp. Similarly, log analytics engine 446 may map a sixth log template to a twelfth candidate log with a timestamp of "T12" (e.g., 1 minute before time "T") and a thirteenth candidate log with a timestamp of "T13" (e.g., 2 minutes before time "T"). Log analytics engine 446 may determine the twelfth candidate log as being the candidate log of the sixth log template with the most recent timestamp. Similarly, log analytics engine 446 may map a seventh log template to a fourteenth candidate log with a timestamp of "T14" (e.g., 1 minute before time "T") and a fifteenth candidate log with a timestamp of "T15" (e.g., 2 minutes before time "T"). Log analytics engine 446 may determine the fourteenth candidate log as being the candidate log of the seventh log template with the most recent timestamp. Log analytics engine 446 may determine candidate logs with the most recent timestamp for each candidate log template in a similar manner.

Log analytics engine 446 may then, for each log template category, rank the mapped log templates based on the corresponding candidate logs with the most recent timestamp. Log analytics engine 446 may group each mapped log template based on the log template category assigned to the log template. For example, log analytics engine 446 may assign the first log template and the second log template, following the example above, the log template category corresponding to well known log templates (e.g., category 1). Log analytics engine 446 may group the first log template and the second log template as well as corresponding candidate logs with most recent timestamps (e.g., the first candidate log and the fourth candidate log, respectively). Log analytics engine 446 may assign the fourth log template and the sixth log template, following the example above, the log template category corresponding to relatively rare log templates (e.g., category 2). Log analytics engine 446 may group the fourth log template and the sixth log template as well as corresponding candidate logs with most recent timestamps (e.g., the eighth candidate log and the twelfth candidate log, respectively). Log analytics engine 446 may assign the third log template, the fifth log template, and the seventh log template, following the example above, the log template category corresponding to unrecognized log templates (e.g., category 3). Log analytics engine 446 may group the third log template, the fifth log template, and the seventh log template as well as corresponding candidate logs with most recent timestamps (e.g., the sixth candidate log, the eleventh candidate log, and the fourteenth candidate log, respectively).

Log analytics engine 446 may select a pre-defined number of mapped log templates based on the ranking of log templates. Log analytics engine 446 may select ranked log templates from each log template category in a round robin manner. In other words, log analytics engine 446 selects an instance of the log template with the most recent timestamp. Following the example described above, log analytics engine 446 may be configured to select three log templates in a round robin manner based on log templates with candidate logs having the most recent timestamp. Log analytics engine 446 may select the first log template (corresponding to the candidate log with a timestamp of "T1") from category 1, the fourth log template (corresponding to the candidate log with the timestamp of "T8") from category 2, and the third log template (corresponding to the candidate log with the timestamp of "T6") from category 3. If log analytics engine 446 is configured to select three log templates in a round robin manner, log analytics engine 446 may select the first log template, the fourth log template, the third log template, the second log template from category 1 (corresponding to the candidate log with the timestamp of "T4"), and the sixth log template from category 2 (corresponding to the candidate log with the timestamp of "T12"). Log analytics engine 446 may select candidate logs from each of the selected log templates by mapping the selected log templates back to corresponding candidate logs. In some instances, log analytics engine 446 may determine critical logs 470 based on selected candidate logs with the most recent timestamp.

In another examples, log analytics engine 446 may determine critical logs 470 based on a critical template score. Log analytics engine 446 may calculate a critical template score for each mapped log template. Log analytics engine 446 may calculate critical template scores based on multiple factors such as a time of occurrence with respect to when performance anomalies of a network application has occurred, a rarity of observed log templated in an analysis or inference window, a log template category assigned to the mapped log template, and whether the mapped log template includes insignificant keywords that often indicate logs that are not very critical. Log analytics engine 446 may assign each factor values corresponding to a weight each factor should influence a calculated critical template score. In some examples, log analytics engine 446 may multiply the weight values of each factor to generate a raw critical template score value between zero and negative infinity. Log analytics engine 446 may normalize (e.g., with a SoftMax function) the raw critical template score to generate a critical template score with a value between zero and one. Log analytics engine 446 may select a number of log templates based on critical template scores for log templates closest to one.

Log analytics engine 446 may calculate critical template scores based on factor weight values. The critical template score may include a template recency time weight, a template rarity weight, a template category weight, a template insignificant keyword weight. The weight value for the template recency time weight may be determined based on timestamps of candidate logs mapped to the log templates. Log analytics engine 446 may give more weight to log templates that are observed closest to the time an application anomaly occurred compared to log templates that are observed in the distant past relative to the application anomaly time. The template recency time weight value may be determined with a sigmoid function of the natural log of the difference in time between the candidate log of a log template and the network application performance issue. By taking the negative sigmoid of the natural log of the time recency, template recency time weight values closer to negative one indicates log templates with candidate logs that occurred in the distant past, and template recency time weight values closer to zero indicate log templates with candidate logs close to the application anomaly time. For example, log analytics engine 446 may determine the time recency of a first log template is 10 and the time recency of a second log template is 150. Log analytics engine 446 may determine the template recency time weight value for the first log template is −0.90 and the template recency time weight value for the second log template is −0.993. In examples when the application anomaly time is unknown, log analytics engine 446 may consider a middle time of the analysis window (e.g., the period of time candidate logs are collected during) as the anomaly occurrence time.

The weight value for the template rarity weight may be determined based on how frequently specific log templates have been observed in the analysis window. Log templates that occur frequently are given lower weight values than log templates that occurred rarely during the analysis window. Log analytics engine 446 determines the template rarity weight value by counting a number of specific log templates that occurred in the analysis window prior to detection of the application anomaly. The template rarity time weight value may be determined with a sigmoid function of the natural log of the frequency (e.g., counted number of instances a log template mapped to candidate logs). By taking the negative sigmoid of the natural log of the frequency, template rarity time weight values closer to negative one indicates log templates that are observed frequently during the analysis window, and template recency time weight values closer to negative 0.5 indicate log templates that are rarely observed during the analysis window. For example, log analytics engine 446 may determine the occurrence count for the first log template is 50 and the occurrence count for the second log template is 2. Log analytics engine 446 may determine the template rarity weight value for the first log template is −0.98 and the template rarity weight value for the second log template is −0.66.

The weight value for the template category weight may be determined based on categories or classifications assigned to log templates. Log analytics engine 446 may assign log template categories to log templates mapped to candidate logs as previously discussed. For example, log analytics engine 446 may assign an unrecognized template category to a log template based on whether the trained template mining model is able to classify log template during the analysis window. Log analytics engine 446 may determine a template category weight value of one for log templates classified in the unrecognized template category. Log analytics engine 446 may assign a critical keyword category to log template that contain specific pre-determined keywords (e.g., failure, error, crash, etc.). Log analytics engine 446 may determine a template category weight value greater than one for log templates classified in the critical keyword category. Log analytics engine 446 may assign a rare template category to log templates based on template rarity weight as previously discussed. Log analytics engine 446 may group log templates based on the template rarity weight values of each log templates. For example, log analytics engine 446 may consider only the top ten percent of log templates with the lowest template rarity weight value as being apart of the rare template category. Log analytics engine 446 may determine a template category weight of 2.5 for log templates for the top 10% of log templates with the lowest template rarity weight values. If a log template is rare, according to how the rare template category is defined, log templates in the critical keyword category and the unrecognized template category are given more weight for them to be selected as critical logs 470. In examples where a log template is assigned to multiple log template categories, analytics engine 446 may take the aggregate of the template category weight determined for each category by multiplying each weight value determined for each template category.

The weight value for the template insignificant keyword weight may be determined based on well known keywords that lack relevance to critical log detection. Log analytics engine 446 may assign a template insignificant keyword weight to log templates that include keywords that lack relevant, such as "GET" or "INFO." Log analytics engine 446 may assign a template insignificant keyword weight of 7.5 to log templates that include insignificant keywords to give a stronger penalty to log templates that contain keywords not relevant to critical log determination.

Log analytics engine 446 may determine a raw critical template score based on weight values determined for each factor. Log analytics engine 446 may determine the raw critical template score with the following equation:

Raw_critical_template_score=template_recency_time_weight*template_rarity_weight*template_category_weight*template_insignificant_keyword_weight*−1

The output of applying the raw critical template score equation above results in a raw critical template score between zero and negative infinity. Log analytics engine 446 may input the raw critical template scores into a SoftMax function to transform the raw critical template score to critical template score. Critical template score may represent a probability candidate logs of a particular log template may be included in critical logs 470. The table below provides an example output of weight values, raw template score values, and template score values for five different log templates that have mapped to candidate logs.

| Name | Recency time weight | Rarity weight | Category weight | Insignificant keyword weight | Raw critical template score | Critical template score |
|---|---|---|---|---|---|---|
| Template 1 | −0.90 | −0.98 | 2.5 | 7.5 | −16.53 | 0.00000005 |
| Template 2 | −0.993 | −0.66 | 1 | 1 | −0.655 | 0.44 |
| Template 3 | −0.998 | −0.50 | 2.5 | 1 | −1.247 | 0.24 |
| Template 4 | −0.998 | −0.99 | 1 | 7.5 | −7.410 | 0.00005 |
| Template 5 | −0.998 | −0.999 | 1 | 1 | −0.997 | 0.31 |

Log analytics engine 446 may select a number of log templates based on the critical template score determined for each mapped log template. For example, according to the table above, log analytics engine 446 may select the top three log templates of "Template 2," "Template 3," and "Template 5" with critical template scores closest to one. Log analytics engine 446 may select a number of candidate logs by mapping the selected templates back to candidate logs with the most recent timestamps. In other words, log analytics engine 446 may select a number of instances of log templates based on the instance with the most recent timestamp.

Figure 4B:
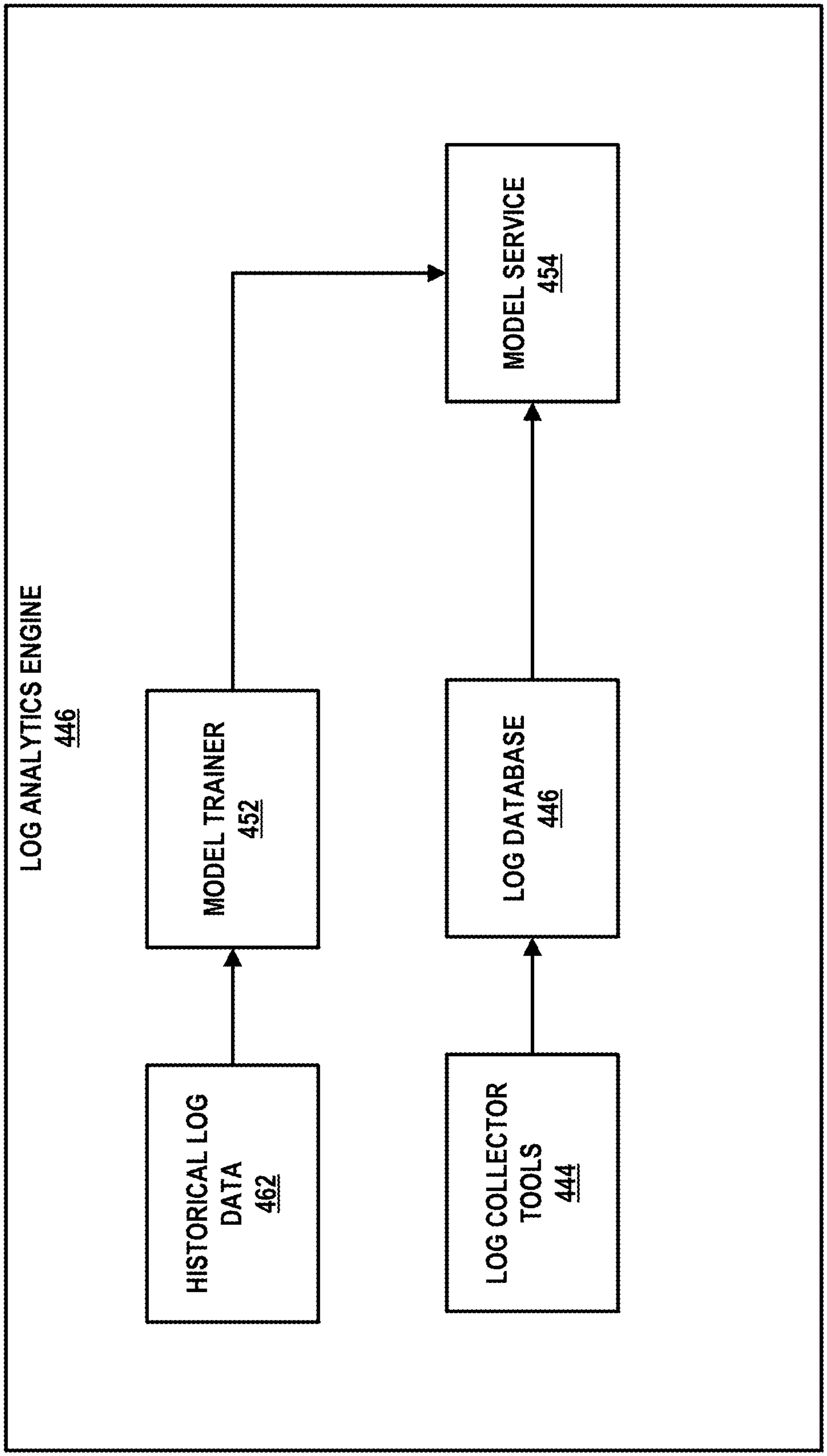
FIG. 4B is a block diagram illustrating an example of a log analytics engine for determining critical logs, in accordance with one or more techniques of this disclosure.

FIG. 4B is a block diagram illustrating an example of a log analytics engine for determining critical logs with a model service, in accordance with one or more techniques of this disclosure. In the example of FIG. 4B, log analytics engine 446, historical log data 462, model trainer 452, model service 454, log collector tools 444, and log database 446 may include examples of log analytics engine 246, historical log data 262, model trainer 252, model service 254, log collector tools 244, and log database 242 of FIG. 2, respectively.

Model trainer 452 may train a template mining model (e.g., model service 454) with historical log data 462. Model trainer 452 may train a template mining model of model service 454 with historical log data 462, such as application layer logs, compute layer logs, and network layer logs collected over a training period. Model trainer 452 may train the template mining model of model service 454 to observe or generate log templates for a plurality of cross-layer system logs. After model trainer 452 trains the template mining model, log analytics engine 446 may apply model service 454 to generate log templates for candidate logs. In some examples, model trainer 452 may generate log templates with the template mining model and provide the log templates to model service 454 for determining which of the plurality of log templates are to be mapped log templates.

Log collector tools 444 may obtain and pre-process candidate logs from multiple layers of a network infrastructure. Log collector tools 444 may pre-process candidate logs by including a source and timestamp in metadata of the candidate logs. Log collector tools 444 may store and index the pre-processed candidate logs in log database 444. Model service 454 may generate log templates for candidate logs and map the candidate logs to log templates to reduce the volume of data that is to be analyzed to determine the critical logs. For example, model service 454 may map multiple logs to the same log template based on the structural similarity. The example below illustrates how model service 454 maps a candidate log to a log template where*represents a variable, masked value:

Original log—sshd[1234]: Accepted password for ops from 192.0.2.3 port 12345 ssh2

Corresponding Template—sshd[*]: Accepted password for*from*port

Application Layer:

Raw Log:

April 25 15:14:32 2023-04-25T15:14:32.475051205Z http.req.id: 9c5dace2-4dfe-4fd1-8c59-df0079f3496b, http.req.method: GET, http.req.path: cart, message: view user cart, session: OcObbe20-8011-4781-afa0-80d205af8f9, severity: debug, timestamp: 2023-04-25T15:14:32.475051205Z Template:

<TIMESTAMP><*> "http.req.id: <*>http.req.method: GET, http.req.path: <*> message: <*><*><*> session: <*> severity: debug, timestamp: <*> APPLICATION Network Layer:

Raw Log:

April 25 14:14:05 2023-04-25T14:14:05.25Z alert_config_deviation_status type: gauge, count: 1, sum: 1, min: 1, max: 1, latest: 1, blueprint: CN2-Hetero, description: Telegraf collected metric, device: jfm-qnc-qfx5k-01, device_key: WS3120270462, device_name: jfm-qnc-qfx5k-01, entity.guid:
Mzc0NjA20XxFWFR8UOVSVKIDRXw0NzIOMTU2-MjgyODc2NjgzMTYw, entity.name: aos-otel-collector, entity.type: SERVICE, host: 045b990d5d7e, http.scheme: http, instrumentation.provider: opentelemetry, metricName:
alert_config_deviation_status, net.host.name: 10.213.15.123, net.host.port: 9126, newrelic.source: api.metrics.otlp, otel.library.name: otel.library.version:, role: leaf, service.instance.id: 10.213.15.123:9126, service.name: aos-otel-collector, severity: ALERT_CRITICAL\, timestamp: 1682432045199

Template:

<TIMESTAMP><*>alert_config_deviation_status type: gauge, count: 1, sum: <*>min: <*>max: <*>latest: <*>blueprint: CN2-Hetero, description: Telegraf collected metric, device: <*>device_key: <*>device_name: <*>entity.guid: <*>, entity.name: aos-otel-collector, entity.type: SERVICE, host: <*>, http.scheme: http, instrumentation.provider: opentelemetry, metricName: alert_config_deviation_status, net.host.name: <*>net.host.port: <*>, newrelic.source: api.metrics.otlp, otel.library.name:
otel.library.version, role: leaf, service.instance.id: <*>, service.name: aos-otel-collector, severity: ALERT_CRITICAL, timestamp: <*>DEVICE Model trainer 452 trains a template mining model used to determine log templates for a set of critical logs. For example, model trainer 452 may implement Drain3 for template generation algorithms. Model trainer 452 may use Drain3 algorithms for template generation and to customize the template generation to optimize for various use cases. Model trainer 452 may use the Drain3 python library that provides utility support for training and storing template-mining models. By model trainer 452 employing a dynamically updating template clustering system of Drain3 template mining models, a template mining model of log analytics engine 446 may dynamically learn templates by masking away variable tokens inside of common strings. Even after being trained, template mining models can be retrained and will update their log templates to reflect new logs being ingested. The template mining model may be trained on normally performing application and infrastructure log data and templatize the logs into clusters, saving the cluster sizes and template strings into a PostgreSQL database. The template mining model may optionally provide REGEX patterns and corresponding masks to insert into strings when found. This allows the template mining model to handle networking-specific logs, including masks for timestamps, container IDs, HTTP response codes, and more.

Log collection tools 444 may ingest logs from an application layer, a compute layer, and a network layer every day. Conveniently, Drain3 models may not need knowledge of log structure and may also not need sourcing to layers. The template mining model may be trained on logs from all layers of the system and it can discern layers from one-another (given that the content of the logs is different). As a redundancy, log collection tools 444 may append the name of the layer to the ingested logs such that they can always be traced back to their source.

Figure 5:
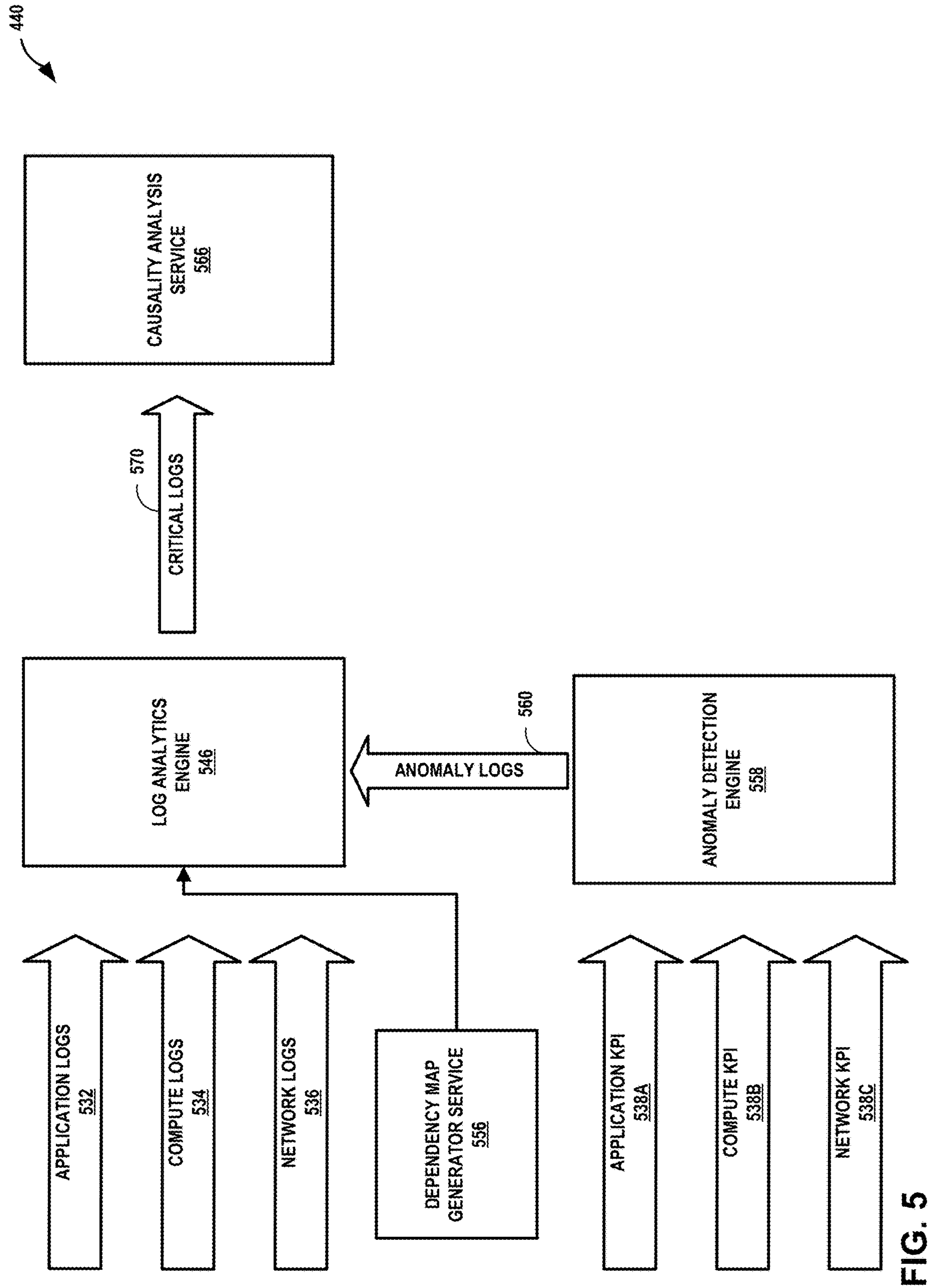
FIG. 5 is a block diagram illustrating an example of an analytics system for determining critical logs, in accordance with one or more techniques of this disclosure.

FIG. 5 is a block diagram illustrating an example of an analytics system for determining critical logs with performance metrics, in accordance with one or more techniques of this disclosure. In the example of FIG. 5, application logs 532, compute logs 534, network logs 536, dependency map generator service 556, log analytics engine 546, and causality analysis service 566 may include examples of application logs 232, compute logs 234, network logs 236, dependency map generator service 256, log analytics engine 246, and causality analysis service 266.

Anomaly detection engine 558 may obtain cross-layer metrics data from various layers of a data center. Cross-layer metrics data may include key performance indicators, traces, or other types of metrics used to measure a performance of data center operations. Anomaly detection engine 558 may analyze cross-layer metrics data 538 for anomalies. For example, anomaly detection engine 558 may analyze application key performance indicators (KPI) 538A, compute key performance indicators (KPI) 538B, and network key performance indicators (KPI) 538C independently. Anomaly detection engine 558 may analyze cross-layer metrics data 538 using machine learning based approaches. Anomaly detection engine 558 may analyze cross-layer performance metrics data 538 for particular nodes identified by dependency map generator service 556 that are determined to be affected by the application anomaly. Anomaly detection engine 558 may generate anomaly logs 560 based on content of cross-layer metrics data 538. Anomaly detection engine 558 may convert values of cross-layer performance metrics data 538 (e.g., values of key performance indicators from each layer) to generate anomaly logs 560. Anomaly logs 560 may include event messages associated with a performance issue and a corresponding timestamp when the performance issue was observed.

Anomaly detection engine 558 may output anomaly logs 560. Anomaly logs 560 may include a set of structured log messages that capture specific metrics that are anomalous when compared to baseline behavior. Anomaly logs 560 may include anomaly messages that specifies a context of specific KPI and layers along with a timestamp when the anomaly was observed. The following is an example schema of an anomaly log message of anomaly logs 560:

```
{
  "metric": "metric name"
  "timestamp": <timestamp when anomaly is detected>
  "value": <anomalous metric value>
  "Labels": {
    entityLayer": <Entity this alarm belongs to>
    "entityType": <Type of Entity e.g. instance, compute, network>
    "entityId": <Unique id of the entity>
    }
}
```

The following is an example of an anomaly log message of anomaly logs 560:

```
{
  "metric": "anomalous_interface_counters_rx_bps",
  "timestamp": 1693001574,
  "Value": "644760"
  "labels": {
    "entityLayer": "Network"
    "entityType": "switch.interface"
    "entityId": "dc1-must-esi-001-leaf1. xe-0/0/1",
    "blueprint": "must_blueprint_dc1",
    "cluster_name": "Apstra_Cluster1",
    "anomalySource": "ad_service"
    }
}
```

Log analytics engine 546 may obtain ingested or pre-processed candidate logs of application logs 532, compute logs 534, and network logs 536. Log analytics engine 546 may reduce the number of candidate logs obtained based on the nodes identified with dependency map generator service 556 specifying a knowledge graph of nodes associated with the application anomaly. Dependency map generator service 556 may determine a subgraph from the anomalous application perspective based on anomaly logs 560. Log analytics engine 546 may obtain candidate logs from nodes in the subgraph that are identified based on metric anomalies of anomaly logs 560. Log analytics engine 546 may determine critical logs 570 based on candidate logs and anomaly logs 560. In some instances, anomaly logs may be included as part of the candidate logs. The following is an example of determining critical logs 570 based on candidate logs and anomaly logs 560.

| Application Layer Logs: |
| --- |
| Sep 05 22:02:27 {"log":"2023-09-05T22:02:27.165933914Z stderr F wget: can't connect to remote host (10.108.237.211): Connection refused", "@timestamp":"2023-09-05T22:05:17.500937079+00:00", "kubernetes":{"pod_name":"busybox-76c87475f-xdbvn","namespace_name":"default","pod_id":"f84e78ed-69dd-4fec-8aa9-7e4a6fd7ed3d","host":"r5-u17-dell","container_name":"busybox","container_image":"docker.io/library/busybox:latest"} } pods |

Network Layer Logs:

Sept 05 22:01:25 “{ "metric": "anomalous_interface_counters_rx_bps", "timestamp": 1693001574,
"Value": "644760" "labels": { “entityLayer”: “Network” “entityType”: “switch.interface”
“entityId”: "dc1-must-esi-001-leaf1. xe-0/0/1", "blueprint": "must_blueprint_dc1",
"cluster_name": "Apstra_Cluster1", “anomalySource”: “ad_service”} switches
Sep 05 22:05:05 {"log":"Sep 5 22:05:05 10.6.1.44 2023-09-06T03:29:04.450527IST aos-server CEF:0|Apstra|AOS|4.1.2-269|101|Alert|10|msg={u'blueprint_label': u'must_blueprint_dc1', u'timestamp': 1693951144450527, u'origin_name': u'XH3719090062::ae4', u'alert': {u'first_seen': 1693951144450489, u'interface_link_status_mismatch_alert': {u'expected_ifstatus': 0, u'ifname': u'ae4', u'hostname': u'dc1-must-esi-001-leaf1', u'actual_ifstatus': 1}, u'raised': True, u'severity': 3, u'id': u'a7f73d9b-9f03-452e-b001-3470c0c338ec'}, u'origin_hostname': u'dc1-must-esi-001-leaf1', 'device_hostname': 'dc1-must-esi-001-leaf1', u'origin_role': u'to_generic'}","@timestamp":"2023-09-05T22:05:05.495466407+00:00"} switches Log analytics engine 546 may provide critical logs 5570 to causality analysis service 566 to troubleshoot performance issues of network applications. Causality analysis service 566 considers different types of telemetry such as logs, metrics, traces concurrently to help pinpoint cause of the performance issues with higher accuracy.

Figure 6:
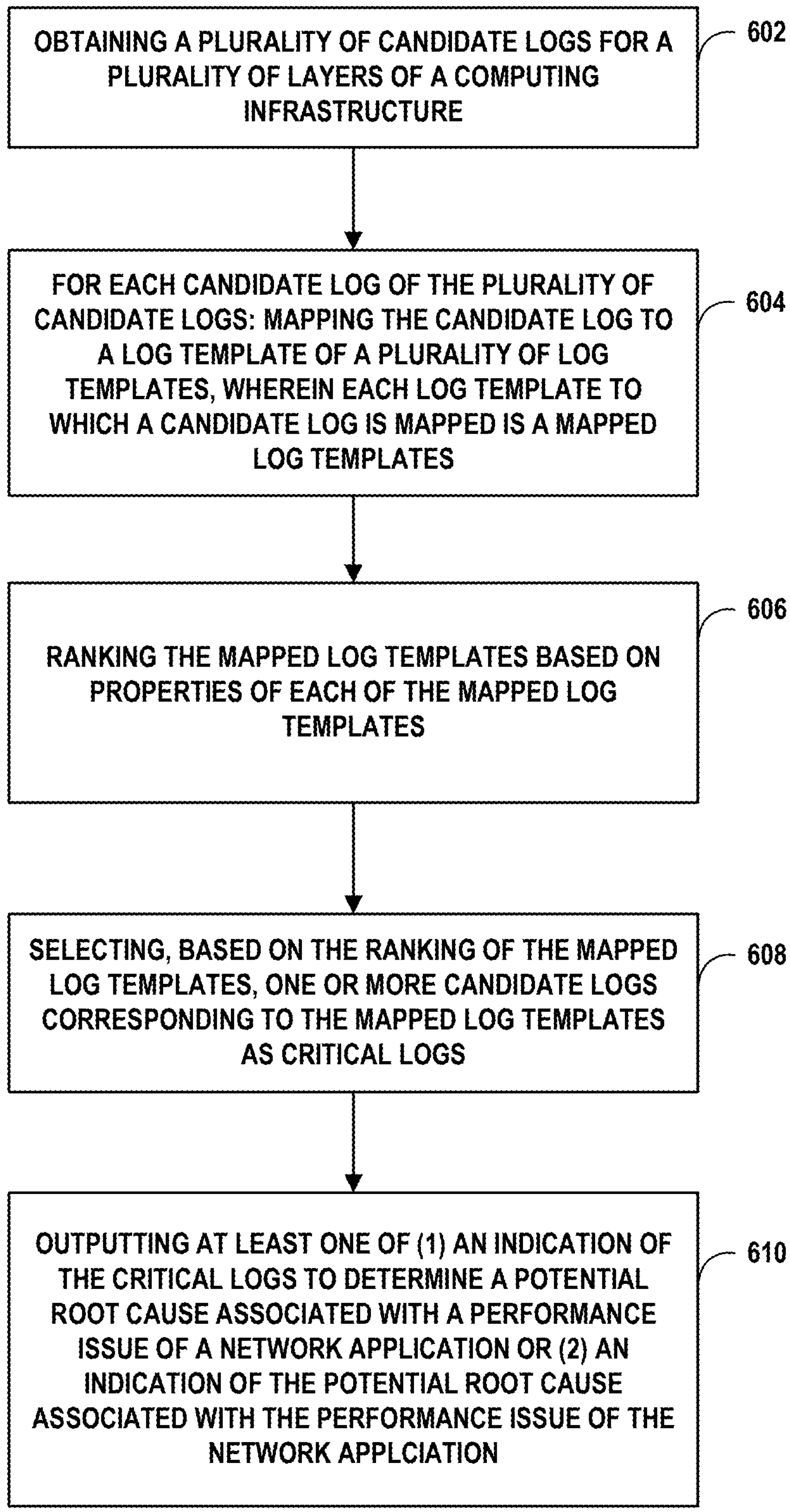
FIG. 6 is a flow diagram illustrating an example operation for determining critical logs, in accordance with one or more techniques of this disclosure.

FIG. 6 is a flow diagram illustrating an example operation for determining critical logs, in accordance with one or more techniques of this disclosure. FIG. 6 is discussed with respect to FIGS. 1-5 for example purposes only.

Analytics system 140 may obtain a plurality of candidate logs for a plurality of layers of computing infrastructure 100 (602). Candidate logs may include system logs from an application layer, system logs from a compute layer, and system logs from a network layer. In some examples, analytics system 140 may determine a subset of system logs from multiple layers based on a knowledge graph identifying nodes of each layer that are affected by a performance issue of a network application.

Analytics system 140 may, for each candidate log of the plurality of candidate logs, map the candidate log to a log template of a plurality of log templates, wherein each log template to which a candidate log is mapped is a mapped logged template (604). In some examples, log templates may be generated during training of a template mining model (e.g., by model trainer 152). In some instances, model service 154 if log analytics engine 154 may generate the log templates.

Analytics system 140, or more specifically model service 154, may rank the mapped log templates based on properties of each of the mapped log templates (606). Model service 154 may rank the mapped log templates based on properties of mapped log templates, such as keywords included in the log template, a number of instances of the log template, and/or whether the trained template mining model learned the log schema of the log template prior to generating the log template. In some examples, model service 154 may assign a category to the mapped log templates based on the properties of the mapped log templates. Model service 154 may consider assigned categories when ranking the mapped log templates.

Model service 154 may select one or more candidate logs corresponding to the mapped log templates as critical logs based on the ranking of the mapped log templates (608). In some instances, model service 154 may first select mapped log templates based on the ranking, then select corresponding candidate logs by mapping the candidate logs with a most recent timestamp back to mapped log templates. In some examples, model service 154 may extract candidate logs as critical logs based on instances of log templates that are selected based on a ranking heuristic. Model service 154 may output at least one of an indication of the critical logs to determine a potential root cause associated with a performance issue of a network application or an indication of the potential root cause associated with the performance issue of the network application (610).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage media comprising instructions that, when executed, cause one or more processors to perform one or more of the methods described above. For example, the computer-readable data storage media may store such instructions for execution by one or more processors.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. Computer-readable storage media may be distributed among multiple packages, devices, or other components capable of being configured with computer instructions.

In some examples, the computer-readable storage media may comprise non-transitory media. The term “non-transitory” may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:

creating, by a computing system, a knowledge graph identifying dependencies of nodes within each of a plurality of layers for a network application, wherein the plurality of layers are layers of a computing infrastructure;

generating, by the computing system and based on metrics from each of the plurality of layers, anomaly logs;

determining, by the computing system and based on the anomaly logs, a plurality of nodes affected by a performance issue, the plurality of nodes including at least one node from each of the plurality of layers;

obtaining, by the computing system and based on the knowledge graph identifying dependencies of the plurality of nodes affected by the performance issue, a plurality of candidate logs for the plurality of layers, wherein the plurality of candidate logs comprise system logs from the plurality of nodes;

for each candidate log of the plurality of candidate logs, by the computing system:

mapping the candidate log to a log template of a plurality of log templates, wherein each log template to which a candidate log is mapped is a mapped log template;

ranking, by the computing system, the mapped log templates based on one or more properties of each of the mapped log templates;

selecting, by the computing system and based on the ranking of the mapped log templates, a set of critical logs from the plurality of candidate logs; and outputting, by the computing system, at least one of (1) an indication of the set of critical logs to enable determination of a potential root cause associated with the performance issue of the network application or (2) an indication of the potential root cause associated with the performance issue of the network application.

2. The method of claim 1, wherein ranking the mapped log templates comprises:

assigning a category to each of the mapped log templates based on the one or more properties of each of the mapped log templates;

determining a most recent timestamp for each mapped log template based on timestamps of candidate logs mapped to the mapped log template; and selecting one or more mapped log templates based on categories assigned to each of the mapped log templates and each of the most recent timestamps.

3. The method of claim 1, wherein ranking the mapped log templates comprises:

assigning a category to each of the mapped log templates based on the one or more properties of each of the mapped log templates;

for each mapped log template, determining a corresponding critical template score based on one or more of a time the performance issue was determined, a number of instances of the mapped log template, the category assigned to the mapped log template, and keywords included in the mapped log template; and selecting one or more mapped log templates based on the corresponding critical template scores determined for each mapped log template.

4. The method of claim 1, wherein the one or more properties of each of the mapped log templates comprise keywords included in the mapped log templates, a number of instances of the mapped log templates, and whether a trained template mining model recognizes log schemes of the log template.

5. The method of claim 1, further comprising:

obtaining the metrics from each layer of the plurality of layers.

6. The method of claim 1, wherein the metrics include values of key performance indicators for the plurality of layers, and wherein generating the anomaly logs comprises converting the values of key performance indicators to event messages.

7. The method of claim 1, wherein selecting the set of critical logs comprises:

selecting one or more mapped log templates based on the ranking of the mapped log templates;

for each of the selected one or more mapped log templates, determining an instance of the mapped log template with a most recent timestamp;

mapping the instances of the mapped log templates back to corresponding candidate logs; and selecting, based on the mapping, the set of critical logs.

8. The method of claim 1, wherein the plurality of layers comprise an application layer, a compute layer, and a network layer, and wherein the plurality of candidate logs comprise application layer logs, compute layer logs, and network layer logs.

9. The method of claim 1, further comprising:

training a template mining model to identify patterns of the plurality of candidate logs; and generating the plurality of log templates by providing historical log data to the template mining model.

10. The method of claim 1, further comprising:

storing, by the computing system, each of the plurality of candidate logs in a database with metadata identifying a layer of the plurality of layers and a timestamp corresponding to a candidate log of the plurality of candidate logs; and obtaining the plurality of candidate logs from the database.

11. The method of claim 1, further comprising: troubleshooting, based on the potential root cause, the performance issue of the network application.

12. The method of claim 9, wherein the historical log data includes a plurality of cross-layer log data during normal system performance and candidate logs obtained during previous critical log determinations.

13. A computing system comprising processing circuitry having access to a storage device, the processing circuitry configured to:

create a knowledge graph identifying dependencies of nodes within each of a plurality of layers for a network application, wherein the plurality of layers are layers of a computing infrastructure;

generate, based on metrics from each of the plurality of layers, anomaly logs;

determine, based on the anomaly logs, a plurality of nodes affected by a performance issue, the plurality of nodes including at least one node from each of the plurality of layers;

obtain, based on the knowledge graph identifying dependencies of the plurality of nodes affected by the performance issue, a plurality of candidate logs for the plurality of layers, wherein the plurality of candidate logs comprise system logs from the plurality of nodes;

for each candidate log of the plurality of candidate logs:

map the candidate log to a log template of a plurality of log templates, wherein each log template to which a candidate log is mapped is a mapped log template;

rank the mapped log templates based on one or more properties of each of the mapped log templates;

select, based on the ranking of the mapped log templates, a set of critical logs from the plurality of candidate logs; and output at least one of (1) an indication of the set of critical logs to enable determination of a potential root cause associated with the performance issue of the network application or (2) an indication of the potential root cause associated with the performance issue of the network application.

14. The computing system of claim 13, wherein to rank the mapped log templates, the processing circuitry is configured to:

assign a category to each of the mapped log templates based on the one or more properties of each of the mapped log templates;

determine a most recent timestamp for each mapped log template based on timestamps of candidate logs mapped to the mapped log templates; and select one or more mapped log templates based on categories assigned to each of the mapped log templates and each of the most recent timestamps.

15. The computing system of claim 13, wherein to rank the mapped log templates, the processing circuitry is configured to:

assign a category to each of the mapped log templates based on the one or more properties of each of the mapped log templates;

for each mapped log template, determine a corresponding critical template score based on one or more of a time the performance issue was determined, a number of instances of the mapped log template, the category assigned to the mapped log template, and keywords included in the mapped log template; and select one or more mapped log templates based on the corresponding critical template scores determined for each mapped log template.

16. The computing system of claim 13, wherein the one or more properties of each of the mapped log templates comprise keywords included in the mapped log templates, a number of instances of the mapped log templates, and whether a trained template mining model recognizes log schemes of the log template.

17. The computing system of claim 13, wherein the processing circuitry is further configured to:

obtain the metrics from each layer of the plurality of layers.

18. Non-transitory computer-readable storage media comprising instructions that, when executed, cause processing circuitry to:

create a knowledge graph identifying dependencies of nodes within each of a plurality of layers for a network application, wherein the plurality of layers are layers of a computing infrastructure;

generate, based on metrics from each of the plurality of layers, anomaly logs;

determine, based on the anomaly logs, a plurality of nodes affected by a performance issue, the plurality of nodes including at least one node from each of the plurality of layers;

obtain, based on the knowledge graph identifying dependencies of the plurality of nodes affected by the performance issue, a plurality of candidate logs for the plurality of layers, wherein the plurality of candidate logs comprise system logs from the plurality of nodes;

for each candidate log of the plurality of candidate logs:

map the candidate log to a log template of a plurality of log templates, wherein each log template to which a candidate log is mapped is a mapped log template;

rank the mapped log templates based on one or more properties of each of the mapped log templates;

select, based on the ranking of the mapped log templates, a set of critical logs from the plurality of candidate logs; and output at least one of (1) an indication of the set of critical logs to enable determination of a potential root cause associated with the performance issue of the network application or (2) an indication of the potential root cause associated with the performance issue of the network application.

19. The non-transitory computer-readable storage media of claim 18, wherein to rank the mapped log templates, the instructions cause the processing circuitry to:

assign a category to each of the mapped log templates based on the one or more properties of each of the mapped log templates;

determine a most recent timestamp for each mapped log template based on timestamps of candidate logs mapped to the mapped log templates; and select one or more mapped log templates based on categories assigned to each of the mapped log templates and each of the most recent timestamps.

20. The non-transitory computer-readable storage media of claim 18, wherein to rank the mapped log templates, the instructions cause the processing circuitry to:

assign a category to each of the mapped log templates based on the one or more properties of each of the mapped log templates;

for each mapped log template, determine a corresponding critical template score based on one or more of a time the performance issue was determined, a number of instances of the mapped log template, the category assigned to the mapped log template, and keywords included in the mapped log template; and select one or more mapped log templates based on the corresponding critical template scores determined for each mapped log template.

* * * * *